US011551157B2

United States Patent
Morita et al.

(10) Patent No.: US 11,551,157 B2
(45) Date of Patent: Jan. 10, 2023

(54) RESERVATION MANAGEMENT SYSTEM, INPUT DEVICE, RESERVATION MANAGEMENT METHOD, AND PROGRAM

(71) Applicant: Panasonic Intellectual Property Management Co., Ltd., Osaka (JP)

(72) Inventors: Yosuke Morita, Osaka (JP); Tomikazu Imai, Kyoto (JP); Naoya Tsukamoto, Osaka (JP); Takayuki Okawa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 421 days.

(21) Appl. No.: 16/638,680

(22) PCT Filed: Nov. 14, 2018

(86) PCT No.: PCT/JP2018/042138
§ 371 (c)(1),
(2) Date: Feb. 12, 2020

(87) PCT Pub. No.: WO2019/102916
PCT Pub. Date: May 31, 2019

(65) Prior Publication Data
US 2021/0192396 A1 Jun. 24, 2021

(30) Foreign Application Priority Data
Nov. 21, 2017 (JP) .............................. JP2017-223286
Jun. 6, 2018 (JP) .............................. JP2018-108994

(51) Int. Cl.
*G06Q 10/02* (2012.01)
*G06F 1/14* (2006.01)
(Continued)

(52) U.S. Cl.
CPC ............... *G06Q 10/02* (2013.01); *G06F 1/14* (2013.01); *G06F 3/14* (2013.01); *G06F 16/22* (2019.01); *G07C 9/00* (2013.01)

(58) Field of Classification Search
CPC ....................................................... G06F 1/14
See application file for complete search history.

(56) References Cited

U.S. PATENT DOCUMENTS

| 6,614,450 B1 * | 9/2003 | Vossler ................. G06F 3/1423 |
| | | 715/752 |
| 2009/0177503 A1 * | 7/2009 | Kawano ............... G06Q 10/109 |
| | | 705/7.18 |

(Continued)

FOREIGN PATENT DOCUMENTS

| JP | 4-76688 A | 3/1992 |
| JP | 5-67115 A | 3/1993 |

(Continued)

OTHER PUBLICATIONS

International Search Report dated Jan. 29, 2019, issued in counterpart International Application No. PCT/JP2018/042138 (1 page).

*Primary Examiner* — Mohammed H Rehman
(74) *Attorney, Agent, or Firm* — WHDA, LLP

(57) ABSTRACT

The reservation management system includes an input device and a reservation management unit. The input device includes a manual operation part movable between a first position and a second position and sends a wireless signal containing movement information of the manual operation part and ID information. The reservation management unit performs reservation management based on the wireless signal sent from the input device. The reservation management unit includes a clock unit, a storage unit, and a determination unit. The clock unit measures time. The storage unit associates reservation information containing a reservation start time, and the ID information with each (Continued)

other and stores them. The determination unit determines a reservation performance status based on a current time, the reservation start time, and the movement information.

17 Claims, 14 Drawing Sheets

(51) Int. Cl.
*G06F 16/22* (2019.01)
*G06F 3/14* (2006.01)
*G07C 9/00* (2020.01)

(56) References Cited

U.S. PATENT DOCUMENTS

| | | | | |
|---|---|---|---|---|
| 2010/0049579 | A1* | 2/2010 | Suzuki | G06Q 10/1095 726/33 |
| 2014/0108084 | A1* | 4/2014 | Bargetzi | H04W 4/80 705/7.19 |
| 2015/0181489 | A1* | 6/2015 | Chong | H04W 24/02 370/331 |
| 2015/0264184 | A1* | 9/2015 | Baba | H04M 3/565 370/261 |

FOREIGN PATENT DOCUMENTS

| | | |
|---|---|---|
| JP | 2009-174136 A | 8/2009 |
| JP | 3191580 U | 7/2014 |

\* cited by examiner

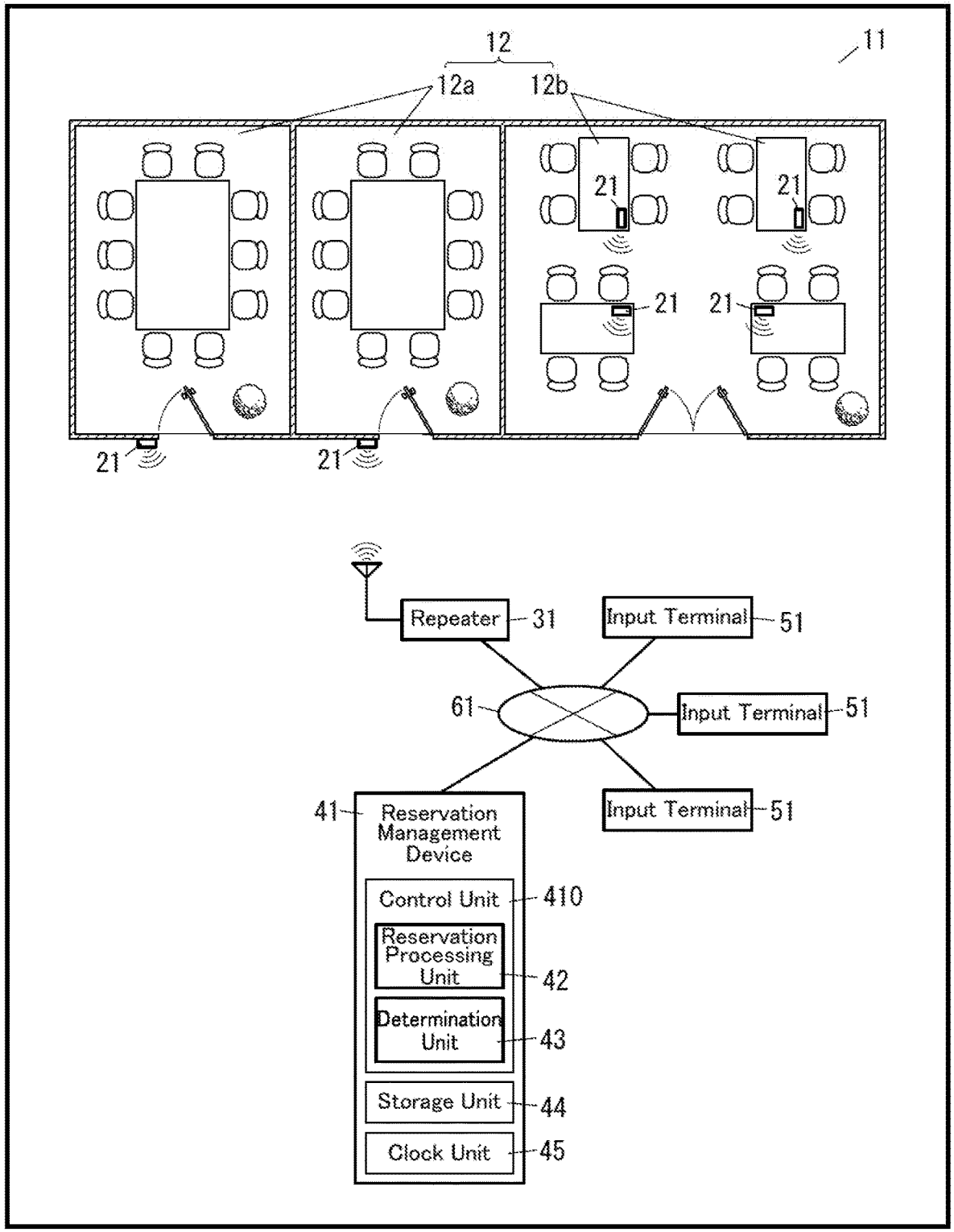

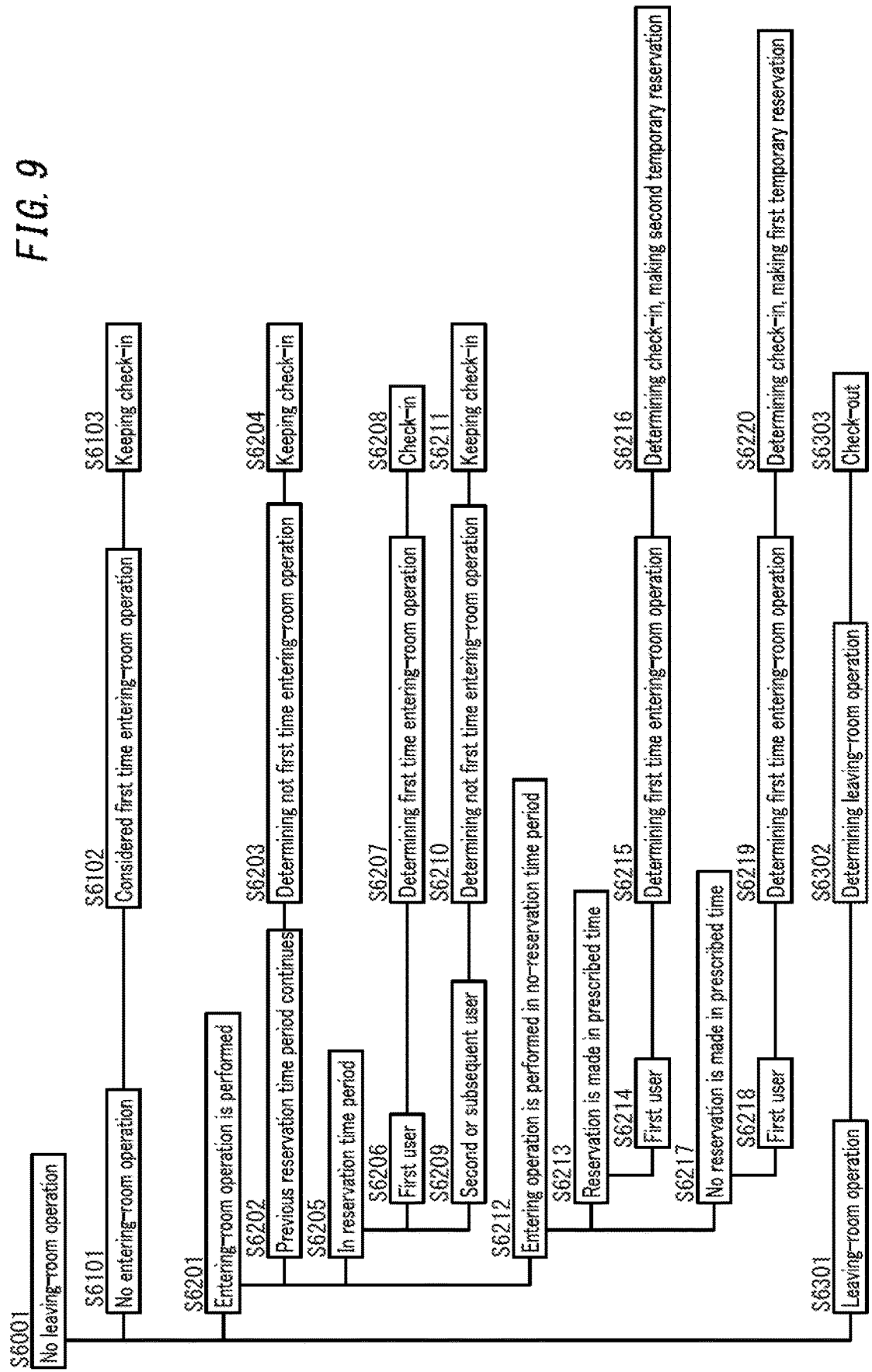

RESERVATION MANAGEMENT SYSTEM, INPUT DEVICE, RESERVATION MANAGEMENT METHOD, AND PROGRAM

TECHNICAL FIELD

The present disclosure generally relates to reservation management systems, input devices, reservation management methods, and programs, and in particular relates to a reservation management system, an input device, a reservation management method, and a program for reservation management.

BACKGROUND ART

In the past, there has been proposed a use status management system (reservation management system) enabling remote check of use statuses of conference rooms, meeting spaces, and the like (see Patent Literature 1). The conventional use status management system includes a display plate device, a repeater, and a processing device.

The display plate includes a plate supporting member and a communication unit. The plate supporting member holds a display plate in a removable manner, and allows a slidable operation of the display plate between a first position making first state information of the display plate visible from a display window, and a second position making second state information of the display plate visible from the display window. The communication unit sends a signal in accordance with movement of the plate supporting member.

The repeater receives a signal from the display plate device, sends it in a converted communication protocol.

The processing device displays a state corresponding to the first state information or the second state information which is exclusively being displayed by the display plate device, based on the signal received from the repeater.

However, the conventional reservation management system merely shows the use status of the facility on the screen, and cannot associate the reservation information and the use status.

CITATION LIST

Patent Literature

Patent Literature 1: JP 3191580 U

SUMMARY OF INVENTION

One object of the present disclosure would be to propose a reservation management system, an input device, a reservation management method, and a program which are capable of associating reservation information and a reservation performance status.

A reservation management system according to one aspect of the present disclosure includes: an input device and a reservation management unit. The input device includes a manual operation part movable between a first position and a second position and is configured to send a wireless signal containing movement information of the manual operation part and ID information in response to movement of the manual operation part. The reservation management unit is configured to perform reservation management based on the wireless signal sent from the input device. The manual operation part is moved from the first position to the second position when performance of a reservation is started, and is moved from the second position to the first position when performance of a reservation is ended. The reservation management unit includes a clock unit, a storage unit, and a determination unit. The clock unit is configured to measure time. The storage unit is configured to associate reservation information containing a reservation start time and the ID information with each other and store them. The determination unit is configured to determine a reservation performance status based on a current time, the reservation start time, and the movement information.

An input device according to one aspect of the present disclosure is used in the reservation management system and includes: the manual operation part; a display unit; and a case. The display unit is configured to display the reservation performance status. The case is for holding the manual operation part and the display unit. The display unit is configured to move in response to movement of the manual operation part and protrude from the case when the manual operation part is in at least one of the first position and the second position.

A reservation management method according to one aspect of the present disclosure performs reservation management based on a wireless signal sent from an input device. The input device includes a manual operation part. The manual operation part is moved from a first position to a second position when performance of reservation is started and is moved from the second position to the first position when performance of reservation is ended. The input device is configured to send the wireless signal containing movement information of the manual operation part and ID information in response to movement of the manual operation part. The reservation management method includes: associating reservation information containing a reservation start time and the ID information with each other and storing them in a storage unit; and determining a reservation performance status of reservation based on a current time, the reservation start time, and the movement information.

A program according to one aspect of the present disclosure allows a computer system to perform the reservation management method.

BRIEF DESCRIPTION OF DRAWINGS

FIG. 1 is a block diagram of a reservation management system according to one embodiment of the present disclosure.

FIG. 9 is an explanatory diagram of another operation of the above reservation management system.

DESCRIPTION OF EMBODIMENTS

Figure 2A:
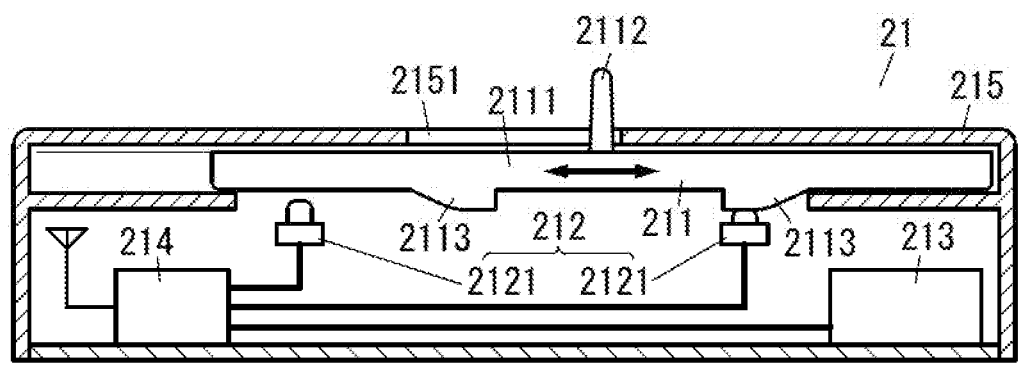
FIG. 2A is a schematic diagram of an input device of the above reservation management system.

Embodiments and variations described below are merely examples of the present disclosure, and the present disclosure is not limited to the embodiments and variations. Various modifications may be made in accordance with the design and the like, except for this embodiment and the variation, as long as they do not depart from the technical concept of the present disclosure.

Embodiment 1

(1) Overview

Before describing a reservation management system in the present embodiment, a general reservation management system will be described below. The general reservation management system includes, for example, an entrance/exit management device for managing entrance to/exit from a conference room. The entrance/exit management device includes, for example, a detection device for detecting a person such as a human sensor or an IC card reader, or a sensor for detecting opening/closing of a door, and a personal computer (hereinafter simply referred to as a computer) or a tablet terminal. An output from the detection device is input to the computer. The management device is installed in the conference room to be managed, and operates with received electric power supplied through a power cable installed in the conference room.

However, for example, in a temporary conference room or meeting space held at an exhibition site, it takes a long work time and a cost to install power cables in a whole of such facilities and to prepare detection devices. Further, in the case of an exhibition, arrangement and positions of conference rooms, meeting spaces, and the like may differ depending on an event. Furthermore, it is not preferable from the viewpoint of security to install expensive computers and tablet terminals in facilities which have low entrance security, allow the general public to enter and exit, and have insufficient monitoring, including these cases.

Therefore, the reservation management system according to the present embodiment aims at realizing a reservation management system that can be installed inexpensively and easily even in places where power supply lines, LAN cables (LAN: Local Area Network) and the like are not installed, or even in places such as low security places which can be used by the general public.

FIG. 1 shows a conceptual diagram of the reservation management system 11 according to the present embodiment. The reservation management system 11 according to the present embodiment is a system that manages reservation of a reservation target, a reservation performance status, and the like.

In the present embodiment, the reservation target includes, for example, use of a conference room 12a, a meeting space 12b, and the like in an office building, which are collectively referred to as a facility 12 hereinafter. That is, in the present embodiment, the reservation management system 11 manages a use reservation of the facility 12, a use status of the facility 12, and the like. Here, the meeting space 12b means a space which is not separated from an adjacent space by using walls or the like and in which a plurality of desks, chairs, and the like for meeting are installed.

The reservation management system 11 includes an input device 21, a reservation management device 41 as a reservation management unit, and an input terminal 51.

The input device 21 is a device for informing people around of the use status of the facility 12 and outputting the use status to the reservation management device 41 via a wireless signal. The input device 21 is located inside the facility or near the facility 12. The input device 21 includes a manual operation part 211 (see FIG. 2A and FIG. 2B) which is moved in response to a manual operation of a user. The movement of the manual operation part 211 exposes a selected one of two indications (e.g., "occupied" and "vacant") of a display unit 2111, and conceals the other indication. As a result, a display state ("occupied", "vacant") of the display unit 2111 informs people around of the use status of the facility 12. The display state of the display unit 2111 indicates an exposed indication of the two indications ("occupied" and "vacant"). When the manual operation part 211 is moved, the input device 21 transmits a state signal including movement information and ID information by a wireless signal. The movement information is information indicating a movement direction of the manual operation part 211.

The reservation management device 41 is, for example, a server, and is configured to be able to communicate with the input device 21 and the input terminal 51. The reservation management device 41 performs reservation management of the facility 12. Specifically, the reservation management device 41 accepts a use reservation of the facility 12, and manages a reservation status of the facility 12, a use status of the facility 12, and the like.

The reservation management device 41 is connected to a line 61. The line 61 is a network line, and may include an Internet line, an in-house intranet line, or the like. A repeater 31 is further connected to the line 61. The repeater 31 is configured to enable wireless communication with the input device 21. That is, in the present embodiment, a wireless signal transmitted from the input device 21 is received by the repeater 31, and the movement information and the ID information included in the wireless signal are transmitted to the reservation management device 41 via the line 61. As a result, the reservation management system 11 can manage the use status of the facility 12 even if a LAN cable or the like is not installed in the facility 12.

The input terminal 51 is a terminal to be operated by a person who wants to use the facility 12 (hereinafter referred to as a "user"). Using the input terminal 51, the user can input (request for) the use reservation of the facility 12, confirm the reservation status and the use status of the facility 12, and the like.

In the reservation management system 11 of the present embodiment, when the user using the facility 12 starts using the facility 12, the user operates the manual operation part 211 of the input device 21 to perform an entering-room operation of changing the display state of the display unit 2111 from "vacant" to "occupied". This entering-room operation triggers transmission of the state signal from the input device 21.

When the user ends the use of the facility 12, the user operates the manual operation part 211 of the input device 21 to perform a leaving-room operation to change the display state of the display unit 2111 from "occupied" to "vacant". This leaving-room operation triggers transmission of the state signal from the input device 21. The reservation management device 41 determines the reservation performance status (use status) of the facility 12 based on the movement information included in the state signal transmitted from the input device 21, the reservation status of the facility 12, and the current time.

As a result, in the reservation management system 11, the reservation information of the facility 12 and the use status (the reservation performance status) can be connected with a simple configuration.

(2) Configuration of Reservation Management System

The configuration of the reservation management system 11 will be described below.

(2.1) Input Device

First, configuration of the input device 21 will be described with reference to FIG. 2A and FIG. 2B.

FIG. 2A is a conceptual diagram of the input device 21. FIG. 2B is a front view of the input device 21.

The input device 21 includes the manual operation part 211, a movement detection unit 212, a power supply unit 213, a communication unit 214, and a case 215. The manual operation part 211, the movement detection unit 212, the power supply unit 213, and the communication unit 214 are housed (held) in the case 215.

As shown in FIG. 1, when the facility 12 is the conference room 12a, the input device 21 (the case 215) is installed in a structure such as a door in a doorway of the conference room 12a, a wall near the doorway, or the like. When the facility 12 is an open space such as the meeting space 12b, the input device 21 (the case 215) is installed, for example, on a desk.

Figure 2B:
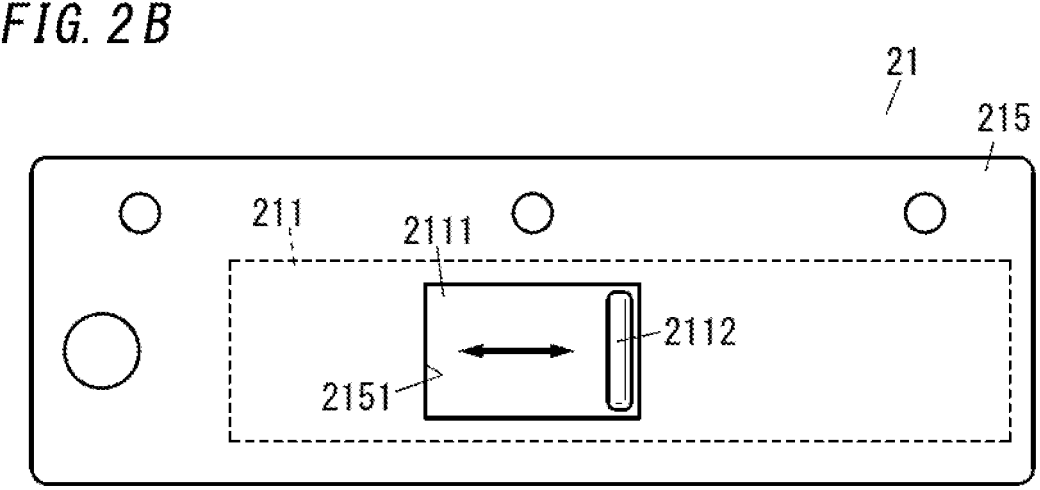
FIG. 2B is a plan view of the above input device.

The case 215 is formed in a rectangular parallelepiped shape that is elongated in one direction (left and right directions in FIG. 2A and FIG. 2B). The case 215 is fixed to a structure such as a door in a doorway, a desk, or a wall by a fixing. The fixing is, for example, a double-sided tape provided on an outer surface of the case 215. The fixing may be a screw coupled to the structure through a fixing hole formed in the case 215. The fixing may be a magnet when a structure such as a door, a wall, or the like is a magnetic material.

An opening 2151 having a rectangular shape elongated in one direction is formed in a front surface of the case 215.

The manual operation part 211 is disposed inside the case 215 to be adjacent to a front side of the case 215, and is configured to be reciprocated along one direction. Arrows in FIG. 2A and FIG. 2B indicate movement directions of the manual operation part 211 and are intangible. The manual operation part 211 includes the display unit 2111, a knob 2112, and a pair of protrusions 2113. The display unit 2111 is formed in a rectangular plate shape elongated in one direction. The knob 2112 protrudes from a center in one direction of one surface of the display unit 2111, that is, a surface close to the opening 2151, and passes through the opening 2151 of the case 215. The user, can slide the manual operation part 211 in one direction by pushing a finger on the knob 2112 protruding from the case 215. That is, the manual operation part 211 can be moved between a first position and a second position along one direction. The first position is a position in which the knob 2112 is located on a first end of the opening 2151 of the case 215 in one direction (a length direction of the opening 2151). The second position is a position in which the knob 2112 is located on a second end of the opening 2151 of the case 215 in one direction.

On one surface of the display unit 2111, the two indications ("occupied (or in use)" and "vacant") indicating the reservation performance status (use status of the facility 12) are provided. One indication is provided on one side with respect to the knob 2112 and the other indication is provided on the other side with respect to the knob. In other words, the two indications indicating the reservation performance status are provided at positions on opposite side of the knob 2112 protruding from the opening 2151 of the case 215. As a result, when the manual operation part 211 is in the first position, one indication is exposed from the opening 2151, and the indication is concealed with the case 215. When the manual operation part 211 is in the second position, the other indication is exposed from the opening 2151, and the one indication is concealed with the case 215. That is, an indication exposed from the opening 2151 of the two indications is switched depending on whether the manual operation part 211 is in the first position or the second position. In the present embodiment, when the manual operation part 211 is in the first position, the indication "vacant" is exposed from the opening 2151. When the manual operation part 211 is in the second position, the indication "occupied" is exposed from the opening 2151. Note that the two indications may be represented by characters, or may be represented by colors, symbols, figures, or the like. The input device 21 may include a liquid crystal display which changes its display content depending on the position of the manual operation part 211, an LED, or the like. In this case, the display unit may be provided separately from the manual operation part 211.

The pair of protrusions 2113 protrude from the other surface of the display unit 2111 (an opposite surface thereof from the opening 2151). The pair of protrusions 2113 are formed apart in one direction, and are provided in back of the two indications ("occupied" and "vacant"), respectively.

The movement detection unit 212 is configured to detect the movement of the manual operation part 211. Specifically, the movement detection unit 212 is configured to determine whether the manual operation part 211 has moved from the first position to the second position and whether the manual operation part 211 has moved from the second position to the first position. The movement detection unit 212 includes two switches 2121. The two switches 2121 are, for example, push switches. The two switches 2121 are arranged so that either one of the switches 2121 is pressed by a corresponding one of the protrusions 2113 in accordance with the position of the manual operation part 211 and turned on. That is, when the manual operation part 211 is in the first position, a first switch 2121 is turned on and a second switch 2121 is turned off. When the manual operation part 211 is in the second position, the first switch 2121 is turned off and the second switch 2121 is turned on. As a result, the movement detection unit 212 can determine whether the manual operation part 211 has moved from the first position to the second position and whether the manual operation part 211 has moved from the second position to the first position, based on the on/off states of the two switches 2121.

The power supply unit 213 is, for example, a primary battery, and supplies electric power to the communication unit 214 and the movement detection unit 212. The power supply unit 213 is not limited to a primary battery, and may be a secondary battery or a commercial power supply. The power supply unit 213 may be a power generating device that generates electric power in response to movement of the manual operation part 211. In this case, the power supply unit 213 includes a coil, and generates electric power by electromagnetic induction caused by a magnet that moves in accordance with the movement of the manual operation part 211. Since the power supply unit 213 generates electric power in response to the movement of the manual operation part 211, the power supply unit 213 can also serve as the movement detection unit 212.

When the power supply unit 213 is a power generating device, there is no need to replace batteries, and convenience is improved.

The communication unit 214 is a wireless communication module capable of transmitting a wireless signal. When the movement detection unit 212 detects the movement of the manual operation part 211, the communication unit 214 transmits a state signal. The state signal is a wireless signal and includes ID information and movement information.

The ID information is unique information of the input device 21. The ID information can be used not only for identifying the input device 21 but also for identifying the facility 12 in which the input device 21 is provided. For example, when the ID information is associated with the management ID of the facility 12 in advance, the reservation management device 41 can identify which facility 12 of a plurality of the facilities 12 that includes the input device 21 sends the status signal. The ID information is stored in a memory provided in the input device 21.

The movement information is information indicating a movement direction of the manual operation part 211. The movement information indicates whether the manual operation part 211 has moved from the first position to the second position or whether the manual operation part 211 has moved from the second position to the first position. In other words, the movement information indicates whether the manual operation part 211 is in the first position or the second position after moved.

When the movement detection unit 212 detects the movement of the manual operation part 211, the communication unit 214 transmits the state signal including the ID information and the movement information. In the present embodiment, the state signal including the movement information indicating movement from the first position to the second position is also referred to as a first signal, and the state signal including the movement information indicating movement moved from the second position to the first position is also referred to as a second signal. That is, when the user starts using the facility 12 and moves the manual operation part 211 from the first position where the indication "vacant" is exposed to the second position where the indication "occupied" is exposed, the communication unit 214 transmits the first signal. When the user ends using the facility 12 and moves the manual operation part 211 from the second position where the indication "occupied" is exposed to the first position where the indication "vacant" is exposed, the communication unit 214 transmits the second signal.

The state signal transmitted from the communication unit 214 is transmitted to the reservation management device 41 via the repeater 31 and the line 61.

(2.2) Input Terminal

The input terminal 51 (see FIG. 1) is a terminal operated by the user of the facility 12. The input terminal 51 is, for example, a personal computer, a smart phone, a tablet terminal, or the like, and is configured to be able to communicate with the reservation management device 41 via the line 61. The personal computer may be a personal computer used personally by the user in the business, or may be a personal computer shared in a department. The smartphone and the tablet terminal may be a smartphone or tablet terminal owned by the user, or may be a shared (business) smartphone or tablet terminal.

Using the input terminal 51, the user can input a use reservation of the facility 12, confirm a reservation status of the facility 12, confirm a use status of the facility 12, and the like.

(2.3) Reservation Management Device

The reservation management device 41 (see FIG. 1) is a server, and is configured to be able to communicate with the input device 21 and the input terminal 51 via the line 61.

The reservation management device 41 includes a control unit 410, a storage unit 44, and a clock unit 45.

The control unit 410 is constituted by, for example, a microcomputer including, as main components, a central processing unit (CPU) and a memory. When the CPU executes a program stored in the memory, the microcomputer functions as the reservation processing unit 42 and the determination unit 43. The program executed by the CPU is recorded in advance in the memory of the microcomputer, but may be provided by being recorded in a recording medium such as a memory card, or may be provided through a telecommunication line such as the Internet.

The reservation processing unit 42 performs reservation processing with regard to the reservation information of the facility 12. The reservation processing unit 42 stores, in the storage unit 44, the reservation information based on the use reservation of the facility 12 input (submitted) from the input terminal 51. The reservation information includes a management ID associated with the facility 12, a reservation start time, a reservation end time, identification information of a user (e.g., a user name), and the like. In the present embodiment, the management ID of the facility 12 is the same as the ID information of the input device 21 provided in the facility 12. The management ID of the facility 12 and the ID information of the input device 21 may be associated with each other, and may be different data from each other.

The storage unit 44 is a storage device such as a semiconductor memory or a hard disk. The storage unit 44 stores the management ID of the facility 12 (the ID information of the input device 21), and reservation information of the facility 12. That is, the storage unit 44 stores the reservation information of the facility 12 associated with the management ID of the facility 12. In other words, the storage unit 44 stores a table of the management ID of the facility 12 and the reservation information. The storage unit 44 stores the reservation start time and the reservation end time of the use reservation of the facility 12.

The storage unit 44 stores current position information of the manual operation part 211 for each input device 21 based on the state signal received by the reservation management device 41. That is, the storage unit 44 associates the position of the manual operation part 211 in the input device 21 and the ID information with each other and stores them. As a result, the control unit 410 can obtain the current position of the manual operation part 211 without communication between the reservation management device 41 and the input device 21.

When an operation for reservation confirmation of the facility 12 is performed by the input terminal 51, the reservation management device 41 transmits the reservation information of each facility 12 stored in the storage unit 44 to the input terminal 51. As a result, the reservation information of each facility 12 is displayed on a display screen of the input terminal 51. The user can operate the input terminal 51 to apply for the use reservation with regard to a time period which is not kept for reservation of the facility 12. In addition, the user can operate the input terminal 51 to make change of the use reservation that his or her (user) has previously applied for (e.g., change of time and cancellation of reservation). When the reservation processing unit 42 receives a change application for the use reservation of the facility 12 from the input terminal 51, it changes the reservation information stored in the storage unit 44 on the basis of the change application.

The clock unit 45 measures time. For example, the clock unit 45 is a real time clock, and is configured to clock the current time. Time information generated by the clock unit 45 is output to the control unit 410 (the reservation processing unit 42 and the determination unit 43).

The determination unit 43 monitors input from the input device 21 of the facility 12, and determines the use status of each facility 12. The determination unit 43 determines the use status (the reservation performance status) of the facility 12 based on the current time, the reservation start time stored in the storage unit 11, and the movement information of the manual operation part 211 of the input device 21. The determination unit 43 stores the use status of the facility 12, which is a. determination result, in the storage unit 44. That is, the storage unit 44 stores the reservation. information of the facility 12 and a result of the reservation performance status (performance history). This result includes information on a time at which use of the facility 12 is started and a time at which use of the facility 12 is finished. The determination of the start and end of use of the facility 12 is performed by the determination unit 43. As a result, the reservation management device 41 can manage a use history of each facility 12 and the like.

As will be described in detail in the chapter "(3) Operation Examples" to be described later, the determination unit 43 determines the use status of the facility 12 based on the movement information of the manual operation part 211 of the input device 21. Hereinafter, examples of the determination by the determination unit 43 will be listed.

The determination unit 43 determines the use status of the facility 12 based on the movement information of the manual operation part 211 of the input device 21 within reception time period of an entering-room operation. The entering-room operation is an operation in which the user of the facility 12 moves the manual operation part 211 of the input device 21 from the first position to the second position.

The reception time period is time based on the reservation start time. Start time of the reception time period is the same as the reservation start time, or predetermined time before the reservation start time, for example, 15 minutes before. The start time of the reception time period can be appropriately changed by changing the setting of the reservation management device 41. End time of the reception time period is time after the predetermined time (e.g., 15 minutes) from the reservation start time.

When receiving the first signal (the state signal including the movement information indicating movement from the first position to the second position) from the input device 21 within the reception time period of the entering-room operation, the determination unit 43 determines that the user who has made the use reservation of the facility 12 has started the use of the facility 12 (checked in) (started performance of the reservation).

Here, for example, when the user wants to start conference at the facility 12 from the reservation start time, a situation that the user enters the facility 12 before the reservation start time and prepares for the conference is assumed. In such a case, the reservation is not cancelled even when the entering-room operation is made before the reservation start time as long as the start time of the reception time period of the entering-room operation is set before the reservation start time. In this case, when receiving the first signal within the reception time period and before the reservation start time, the determination unit 43 treats reception of the first signal as the first time reception within the reservation time, and considers the use of the facility 12 to be moved forward. Therefore, the determination unit 43 does not cancel the reservation even when the user does not perform the entering-mom operation after the reservation start time.

Further, when receiving the second signal (the state signal including the movement information indicating movement from the second position to the first position) from the input device 21, the determination unit 43 determines that the user has finished the use of the facility 12 (checked out) (the performance of the reservation has ended). That is, when receiving the second signal from the input device 21, the determination unit 43 determines that a leaving-room operation has been performed. The leaving-room operation is an operation in which the user of the facility 12 moves the manual operation part 211 of the input device 21 from the second position to the first position. When the leaving-room operation is performed before the reservation end time, reservation for a remaining time period until the reservation end time is canceled. Thus, for example, another user who wants to use the facility 12 can make a reservation for the time period of the canceled reservation. As a result, efficient use of the facility 12 can be promoted. When the leaving-room operation is not performed by the reservation end time, the determination unit 43 determines that the use of the facility 12 is extended. Then, when the leaving-room operation is performed after the reservation end time, the determination unit 43 determines that the extended use of the facility 12 has been finished (checked out).

When not receiving the first signal from the input device 21 within the reception time period of the entering-room operation and the manual operation part 211 of the input device 21 remains at the first position (vacant indication), the determination unit 43 determines that the use of the facility 12 is not started. In this case, the determination unit 43 cancels the reservation of the facility 12, and deletes the reservation information stored in the storage unit 44. For example, the reservation is automatically canceled if the user who has reserved the facility 12 loses his or her intention to use the facility 12 but forgets to cancel the reservation. Thus, for example, another user who wants to use the facility 12 can make a reservation for the time period of the canceled reservation. As a result, efficient use of the facility 12 can be promoted.

Note that, the determination unit 43 may not be limited to being configured to change (delete) the reservation information stored in the storage unit 44. For example, the determination unit 43 may be configured to give instructions to change (delete) the reservation information stored in the storage unit 44. For example, the reservation processing unit 42 changes (deletes) the reservation information stored in the storage unit 44 in response to the instructions from the determination unit 43.

When the manual operation part 211 of the input device 21 is already in the second position (occupied indication) at the start of the reception time period of the entering-room operation, the determination unit 43 determines that the user who has made the use reservation of the facility 12 has started the use of the facility 12 (has started the performance of the reservation). That is, the determination unit 43 regards continuation of occupation of the user of the previous reservation as entrance of a user of a next reservation (continuous use: allowed). For example, in the case where the reservation time periods are continuous, even when the user of the previous reservation does not perform the leaving-room operation at the end of the use of the facility 12 and thus the input device 21 keeps showing occupied indication, the determination unit 43 determines that the use is started when the reservation start time of the next reservation comes. As a result, the user does not need to perform the leaving-room operation and the entering-room operation sequentially.

According to the setting of the reservation management device 41, the determination unit 43 may determine that the use of the facility 12 is not started even when the manual operation part 211 is already in the second position at the start of the reception time period (continuous use: not allowed). In this case, when the user of the previous reservation does not perform the leaving-room operation at the end of the use of the facility 12 and the reservation start time of the next reservation comes while the input device 21 shows occupied indication, the determination unit 43 cancels the reservation after a lapse of the predetermined time. Therefore, when the input device 21 shows occupied indication at the time of starting the use of the facility 12, the user needs to perform the leaving-room operation once and then entering-room operation. As a result, the determination unit 43 determines that the use of the facility 12 for the next reservation is started (checked in), and therefore the reservation is not canceled.

Further, when receiving the first signal from the input device 21 in a time period which is outside the reception time period and is not reserved, the determination unit 43 determines that a temporary use reservation (temporary reservation) is made and the use of the facility 12 by a guest is started (checked in). In this case, the determination unit 43 stores, in the storage unit 14, reservation information in which time at which the first signal is received is set as the reservation start time. The reservation end time of the temporary reservation is set to time after a lapse of the predetermined time (e.g., 15 minutes or 30 minutes) from the reservation start time or the reservation start time of the next use reservation. Therefore, information of temporary reservation is reflected on the confirmation screen of the reservation status displayed on the input terminal 51. According to the setting of the reservation management device 41, the determination unit 43 does not need to store the reservation information of the temporary reservation in the storage unit 44 even when the first signal is received from the input device 21 in a time period which is outside the reception time period and is not reserved (temporary reservation: not allowed). In this case, the storage unit 44 stores a result of performance of temporary use of the facility 12 made by a guest (performance history).

Here, in the case of the temporary use, since the user is in the facility 12, it is impossible to immediately confirm whether or not the temporary reservation is normally completed unless the user carries the input terminal 51. Therefore, when the temporary reservation is normally completed, the reservation management device 41 may transmit a reservation completion signal to the input device 21 via the repeater 31. In this instance, it is preferable that the input device 21 includes a reservation display unit such as a liquid crystal display or one or more LEDs (Light Emitting Diodes) in order to display that the temporary reservation is normally completed. Upon receiving the reservation completion signal, the input device 21 uses the reservation display unit to display that the temporary reservation is normally completed. When the reservation display unit includes a liquid crystal display, reservation time, the reservation end time, or the like may be displayed on the liquid crystal display. When the reservation display unit includes one or more LEDs, reservation time can be indicated by the number of lighting LEDs.

Further, the determination unit 43 determines that the use of the facility 12 is finished (performance of reservation is finished) after the predetermined time from movement of the manual operation part 211 from the second position (occupied indication) to the first position (vacant indication). That is, when the manual operation part 211 is moved to the second position again within the predetermined time after the manual operation part 211 is moved from the second position to the first position, the determination unit 43 determines that the use of the facility 12 is continued. For example, the determination unit 43 starts measuring time by a timer when receiving the second signal. When receiving the first signal within the predetermined time, the determination unit 43 determines that the use of the facility 12 is continued. In other words, when not receiving the first signal within the predetermined time after receiving the second signal, the determination unit 43 determines that the use of the facility 12 is ended (checked out). As a result, even when the user erroneously performs the leaving-room operation on the input device 21, the leaving-room operation is invalidated when the entering-room operation is performed within the predetermined time. Therefore, it is suppressed that the use reservation is erroneously terminated. However, the above determination is made for a reservation use of which is already started (checked in). When check-in have never been confirmed, the above determination is not made.

When the entering-room operation is already performed within the reservation time. the determination unit 43 may determine that a second or subsequent time entering-room operation (more than one time entering-room operation) is invalid. The second or subsequent time entering-room operation means entering-room operation which is made again by the user after the leaving-room operation is made once. That is, when the first signal is received twice or more within the reservation time, the determination unit 43 ignores the second or subsequent time first signal not to determine that check-in takes place, and determines that the use of the facility 12 is continued (i.e., the check-in is continued). As a result, it is possible to suppress duplication of the determination of the start of use of the facility 12 (check-in). In addition, it is possible to suppress erroneous determination that the use of the facility 12 is finished (checked out).

According to the setting of the reservation management device 41 described above, performance patterns of determination processing by the determination unit 43 are classified into eight patterns A to H shown in Tables 1 and 2.

TABLE 1

| | | Reception Time Period of Entering-room Operation | |
|---|---|---|---|
| | Continuous Use: Allowed | After Reservation Start Time | Before Reservation Start Time |
| Temporary Reservation | Allowed | Pattern A | Pattern B |
| | Not allowed | Pattern C | Pattern D |

TABLE 2

| Continuous Use: Not allowed | | Reception Time Period of Entering-room Operation | |
|---|---|---|---|
| | | After Reservation Start Time | Before Reservation Start Time |
| Temporary Reservation | Allowed | Pattern E | Pattern F |
| | Not allowed | Pattern G | Pattern H |

Note that the reservation processing unit 42 and the determination unit 43 are not limited to being provided in the same device (server), and may be provided in different devices (servers). Further, in this case, the storage unit 44 may be constituted by memories of both devices (servers), or may be provided in another device (server). The reservation processing unit 42 may be realized by a general-purpose reservation program.

(3) Operation Examples

Next, operation examples of the reservation management system 11 of the present embodiment will be described.

Figure 3:
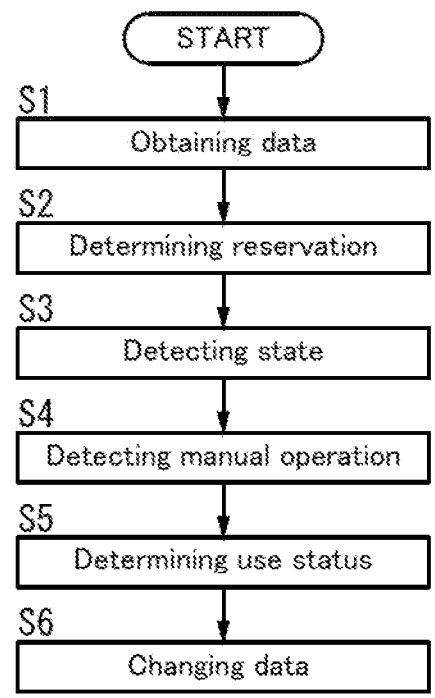
FIG. 3 is a flow chart of a basic operation of the above reservation management system.

First, as basic operation of the reservation management system 11 will be described with reference to FIG. 3.

The determination unit 43 obtains the reservation information stored in the storage unit 44 and the current time information generated by the clock unit 45 (data obtainment step S1). Then, the determination unit 43 compares the start time of the reception time period based on the reservation start time with the current time, and determines whether or not a reservation is present (reservation determination step S2). Note that, the reservation processing unit 42 may determine whether or not a reservation is present, instead of the determination unit 43.

When a use reservation of the facility 12 is present, the determination unit 43 refers to the storage unit 44 when the start time of the reception time period comes, and checks the position of the manual operation part 211 of the input device 21 corresponding to the facility 12 (state detection step S3).

When the manual operation part 211 is in the first position (vacant indication), the determination unit 43 receives the state signal (first signal) from the input device 21 in the reception time period thereby detecting the entering-room operation by the manual operation part 211 (manual operation detection step S4). Further, the determination unit 43 receives the state signal from the input device 21 (second signal), thereby detecting the leaving-room operation by the manual operation part 211.

The determination unit 43 determines (infers) the use status of the facility 12 based on the state signal from the input device 21 (use status determination step S5). For example, the determination unit 43 determines the use status (vacant or occupied indication) of the facility 12 at that time on the basis of the state signal (the ID information, the movement information) received from the input device 21 in the reception time period. That is, the determination unit 43 receives the first signal (which means change from the vacant indication to the occupied indication), thereby determining that the use of the facility is started (checked in). In addition, the determination unit 43 receives the second signal (which means change from the occupied indication to the vacant indication), thereby determining that the use of the facility 12 is finished (checked out).

As a result, the reservation management device 41 can monitor the use status of the facility 12.

The determination unit 43 changes the reservation information, the use status, and the like stored in the storage unit 44 according to the determination result (data change step S6). For example, when "occupied" is not made after a lapse of the reception time period, the determination unit 43 cancels the reservation. When the use of the facility 12 is ended before the reservation end time and the determination unit 43 receives the second signal, the determination unit 43 cancels the reservation for time to the reservation end time. Therefore, another user can reserve a time period of the canceled reservation. As a result, it is possible to shorten useless time in which the facility 12 is in the reserved state but is vacant, and therefore the efficient use of the facility 12 can be promoted.

In addition, even when receiving the first signal in a time period outside the reception time period, the determination unit 43 can detect change of the state of the facility 12 to an in-use (occupied) state. Accordingly, the reservation management system 11 (the reservation management device 41) can manage a result of actual use of the facility 12.

As described above, the reservation management device 41 can manage the use status of the facility 12 based on the state signals (first signal and second signal) transmitted from the input device 21 in response to user's manual operation to the input device 21. Therefore, the use status of the facility 12 can be managed for reservations with a simple configuration by using only the manual operation information of the input device 21.

(3.1) First Operation Example

Figure 4:
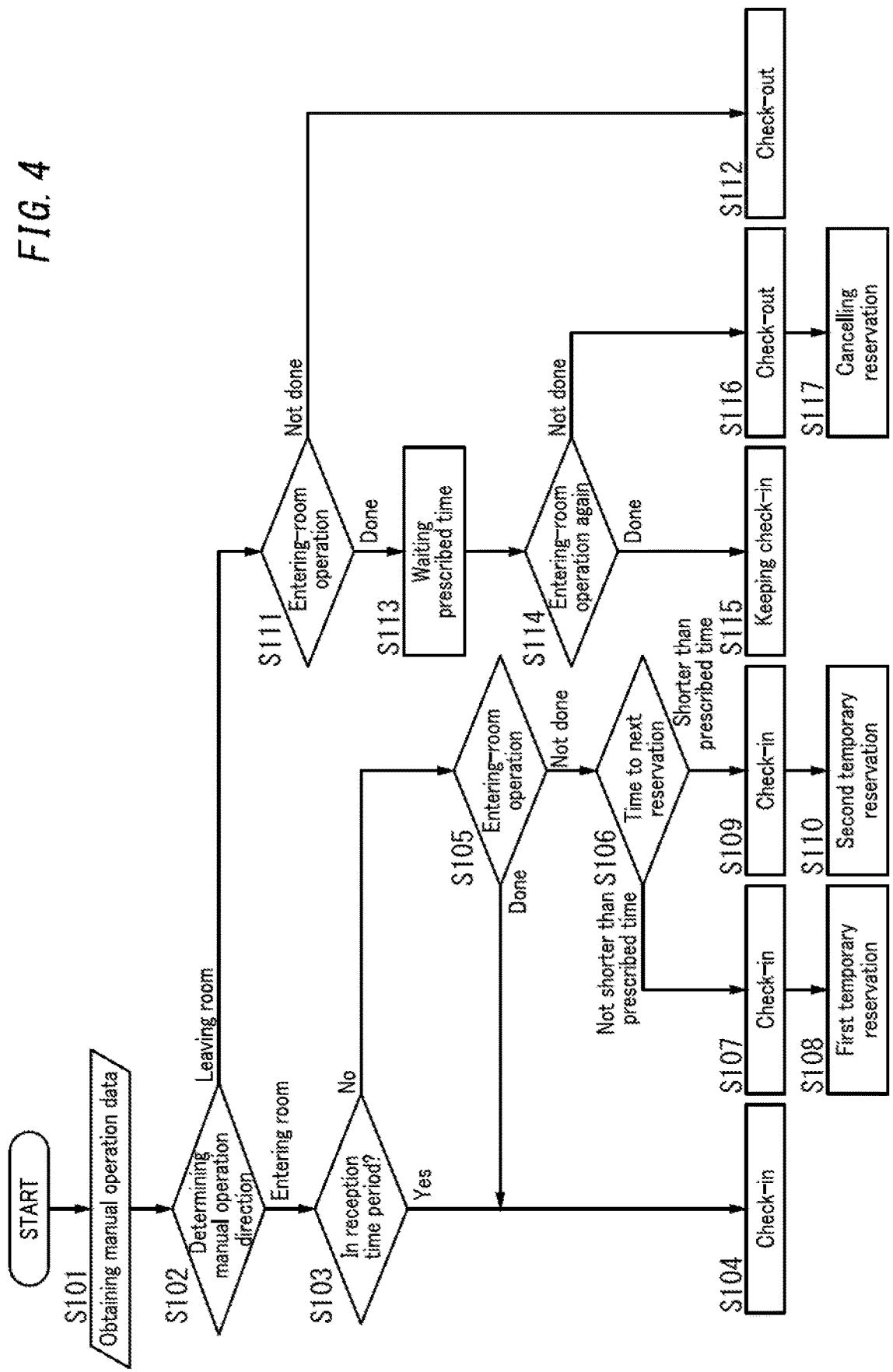
FIG. 4 is a flow chart of a first operation example of the above reservation management system.

Hereinafter, a first operation example of the reservation management system 11 will be described with reference to FIG. 4.

The first operation example is an example of an operation stalling from a manual operation to the input device 21. In the first operation example, the reservation management device 41 is set so that the performance pattern of the determination processing by the determination unit 43 is any one of the patterns A, B, E, and F (see Table 1 and Table 2). That is, in the first operation example, the temporary reservation is set to be performed when the entering-room operation is performed in a time period outside the reception time period.

First, the determination unit 43 receives the state signal from the input device 21 (S101).

Next, the determination unit 43 identifies the manual operation direction of the manual operation part 211 based on the state signal from the input device 21 (S102). When the manual operation direction of the manual operation part 211 is a direction from the first position (vacant indication) to the second position (occupied indication) (S102: entering room), the determination unit 43 checks whether or not the current time is within the reception time period of the entering-room operation (S103). When the current time is within the reception time period of the entering-room operation (S103: YES), the determination unit 43 determines that the use of the facility 12 is started (checked in) (S104).

When the current time is outside the reception time period of the entering-room operation (S103: No), the determination unit 43 checks whether or not the entering-room operation is made one or more times in the reservation time (S105). That is, the determination unit 43 checks whether or not another user already performs the entering-room operation within the reception time period and the reservation of the facility 12 is effective. When determining that the entering-room operation is made one or more times in the reservation time (S105: Yes), the determination unit 43 determines that the use of the facility 12 continues because the use reservation of the facility 12 is effective (S104).

When determining that the entering-room operation is not made one or more times in the reservation time (S105: No), the determination unit 43 determines that there is temporary use by a guest not making a reservation. in this instance, the determination unit 43 determines time until the reservation start time of the next reservation (S106). When the time until the reservation start time of the next reservation is equal to or longer than prescribed time (S106: not shorter than prescribed time), the determination unit 43 determines that the use of the facility 12 by the guest is started (checked in) (S107). In this instance, a temporary reservation (first temporary reservation) is made (S108) in which the reservation end time is set to time after the predetermined time (not longer than the prescribed time) from time when the entering-room operation is performed.

When time until the next reservation start time is shorter than the prescribed time (S106: shorter than prescribed time), it is determined that the use of the facility 12 by the guest is started (checked in) (S109). In this instance, a temporary reservation (second temporary reservation) is made (S110) in which the reservation start time of the next reservation is set as the reservation end time.

When the manual operation direction of the manual operation part 211 is a direction from the second position (occupied indication) to the first position (vacant indication) (S102: leaving room), the determination unit 43 checks whether or not the entering-room operation is made one or more times in the reservation time (S111). That is, the determination unit 43 checks whether or not the facility 12 is in use. When the entering-room operation is not made one or more times in the reservation time (S111: NO), the determination unit 43 determines that the previous reservation with no extension or no leaving-room operation is ended (checked out) (S112).

When the entering-room operation is made one or more times in the reservation time (S111: YES), the determination unit 43 waits the prescribed time (S113). During the prescribed time, the determination unit 43 checks whether or not a reentering-room operation is made (S114). When the reentering-room operation is made in the prescribed time (S114: done), the determination unit 43 determines that the use (check-in) of the facility 12 continues (S115). That is, since the entering-room operation is performed within a short time after the leaving-room operation is performed, the determination unit 43 invalidates the leaving-room operation. When the reentering-room operation is not performed in the prescribed time (S114: not done), the determination unit 43 determines that the use of the facility 12 is ended (checked out) (S116). In this instance, the determination unit 43 cancels a reservation of a time period from time the determination unit 43 determines check-out to the reservation end time (S117). Therefore, another user can make a reservation for the time period of the cancelled reservation, and use the facility 12.

(3.2) Second Operation Example

Figure 5:
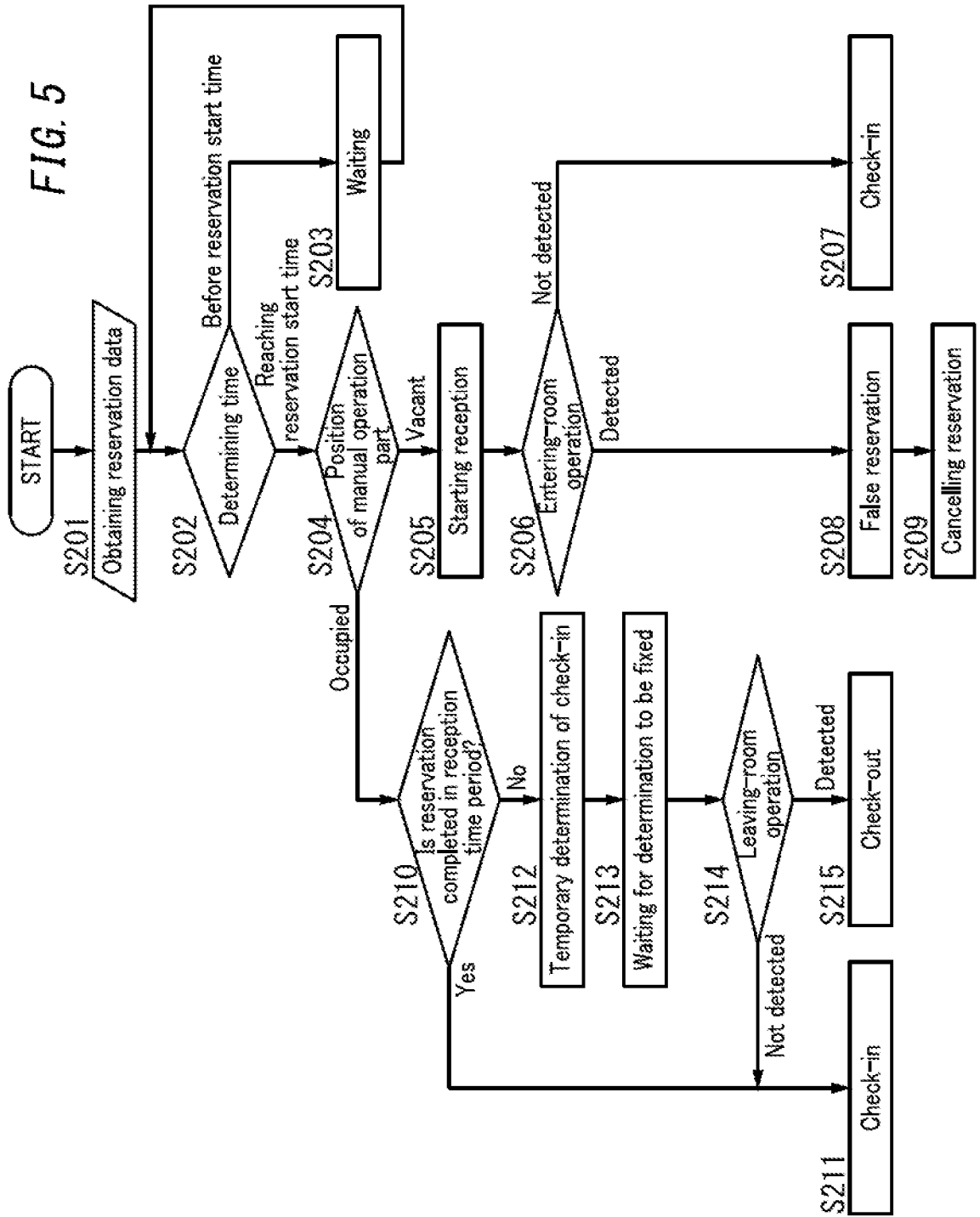
FIG. 5 is a flow chart of a second operation example of the above reservation management system.

Next, a second operation example of the reservation management system 11 will be described with reference to FIG. 5.

The second operation example is an example of an operation starting from application (input) for reservation of use of the facility 12 to the reservation management device 41. In the second operation example, the reservation management device 41 is set so that the performance pattern of the determination processing by the determination unit 43 is the pattern A (see Table 1). That is, in the second operation example, it is set that the continuation of the occupied state of the user of the previous reservation is regarded as the entrance of the user of the next reservation (continuous use: allowed). In the second operation example, it is set that the temporary reservation is made when the entering-room operation is performed outside the reception time period. In the second operation example, the start time of the reception time period of the entering-room operation is set to the reservation start time.

First, when application or change of the use reservation of the facility 12 is done by the input terminal 51, the determination unit 43 obtains the reservation information (S201).

The determination unit 43 compares the reservation start time (start time of the reception time period) with the current time (S202). When the current time is before the reservation start time (S202: before reservation start time), the process waits until the reservation start time (S203). When the current time reaches the reservation start time (S202: reaching reservation start time), the determination unit 43 checks the position (first position, second position) of the manual operation part 211 of the input device 21 (S204).

When the position of the manual operation part 211 at the current time is the first position (vacant indication) (S204: vacant), reception for the entering-room operation is started (S205). The determination unit 43 checks whether or not the entering-room operation is performed in the reception time period (S206). When the entering-room operation is performed in the reception time period (S206: detected), the determination unit 43 determines that the use of the facility 12 is started (checked in) (S207).

Further, when the entering-room operation is not performed in the reception time period (S206: not detected, the determination unit 43 determines that there is a reservation with no use of the facility 12 (so-called false reservation) (S208). In this instance, the determination unit 43 cancels the reservation (S209). As a result, another user can make a reservation for a time period of the canceled reservation. In addition, since the user who makes the false reservation can be identified, an administrator of the facility 12 can provide notifications for the false reservation.

When the position of the manual operation part 211 at the current time is the second position (occupied indication) (S204: occupied), the determination unit 43 checks whether or not the next reservation is completed within the reception time period (S210). When the next reservation is completed within the reception period (S210: YES), the determination unit 43 determines that the use of the facility 12 is started (checked in) (S211). That is, the determination unit 43 regards continuation of occupation of the previous user as entrance (check-in) of the next user.

When the next reservation is not completed within the reception time period (5210: No). the determination unit 43 temporarily determines that the use of the facility 12 is started (checked in) (S212). In this instance, the determination unit 43 waits for fixedness of determination for the predetermined time (S213). The determination unit 43 checks whether or not the leaving-room operation is made in waiting time (5214). When the leaving-room operation is not made in the waiting time (S14: not detected), the determination unit 43 fixes determination that the use of the facility 12 is started (checked in) (S211). In addition, when the leaving-room operation is performed in the waiting time (S214: detected), the determination unit 43 determines that the use of the facility 12 of the previous reservation is ended (checked out) (S215).

(3.3) Third Operation Example

Figure 6:
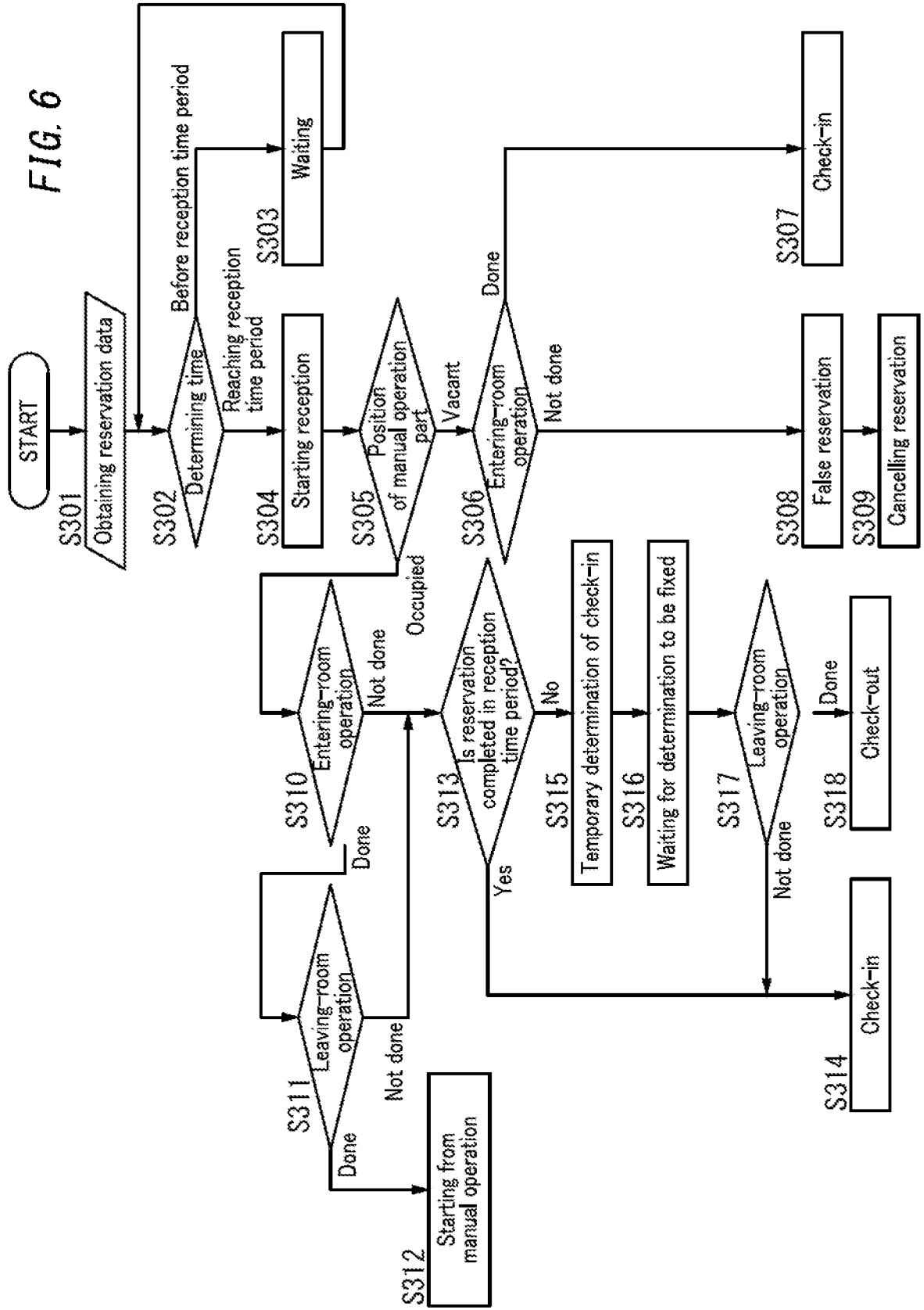
FIG. 6 is a flow chart of a third operation example of the above reservation management system.

Next, a third operation example of the reservation management system 11 will be described with reference to FIG. 6.

The third operation example is an example of an operation starting from application (input) of the use reservation of the facility 12 to the reservation management device 41. In the third operation example, the reservation management device 41 is set so that the performance pattern of the determination processing by the determination unit 43 is the pattern B (see Table 1). That is, in the third operation example, it is set that the continuation of the occupation of the user of the previous reservation is regarded as the entrance of the user of the next reservation (continuous use: allowed). In the third operation example, the start time of the reception time period of the entering-room operation is set to the predetermined time before the reservation start time.

First, when application or change of the use reservation of the facility 12 is made by the input terminal 51, the determination unit 43 obtains the reservation information (S301).

The determination unit 43 compares the start time of the reception time period (the predetermined time before the reservation start time) with the current time (S302). When the current time is before the start time of the reception time period (S302: before reception time period), the process waits until the start time of the reception time period (S303). When the current time reaches the start time of the reception time period (S302: reaching reception time period), the determination unit 43 starts reception of the entering-room operation (S304). The determination unit 43 checks the position (first position, second position) of the manual operation part 211 of the input device 21 when the reception time period (S305) comes.

When the position of the manual operation part 211 at the current time is the first position (vacant indication) (S305: vacant), the determination unit 43 checks whether or not the entering-room operation is made in the reception time period (S306). The step S306 and the subsequent steps S307 to S309 are the same as the step S206 to S209 of the aforementioned second operation example (see FIG. 5) and therefore descriptions thereof are omitted.

When the position of the manual operation part 211 at the current time is the second position (occupied indication) (S305: occupied), whether or not the entering-room operation is made one or more tunes in the reservation time is checked (S310).

When the entering-room operation is made one or more times in the reservation time (S310: done), the determination unit 43 checks whether the leaving-room operation is made by the reservation start time (S311). When the leaving-room operation is performed by the reservation start time (S311: done), the reservation management device 41 performs operation starting from the manual operation to the input device 21 described in the aforementioned first operation example (see FIG. 4) (S312).

When the entering-room operation is not made one or more times in the reservation time (S310: not done) or when the leaving-room operation is not performed by the reservation start time (S311: not done), it is checked whether or not the subsequent reservation is completed within the reception time period (S313).

The step S313 and the subsequent steps S314 to S318 are the same as the steps S210 to S215 of the second operation described above, and therefore descriptions thereof are omitted.

(3.4) Fourth Operation Example

Figure 7:
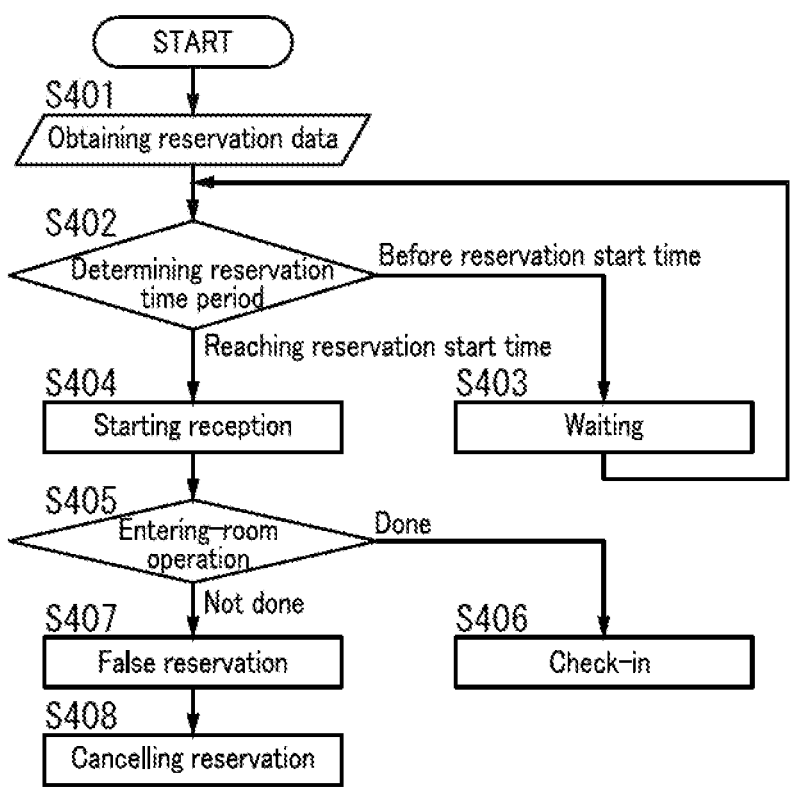
FIG. 7 is a flow chart of a fourth operation example of the above reservation management system.

Next, a fourth operation example of the reservation management system 11 will be described with reference to FIG. 7.

The fourth operation example is an example of an operation starting from application (input) for the use reservation of the facility 12 to the reservation management device 41. In the fourth operation example, the reservation management device 41 is set so that the execution pattern of the determination processing by the determination unit 43 becomes the pattern E (see Table 2). That is, in the fourth operation example, it is set that the continuation of the entry state of the user of the previous reservation is not regarded as the entrance of the user of the next reservation (continuous use: not allowed). In the fourth operation example, the start time of the reception time period of the entering-room operation is set to the reservation start time.

First, when application or change of the use reservation of the facility 12 is done by the input terminal 51, the determination unit 43 obtains the reservation information (S401).

The determination unit 43 compares the reservation start time (start time of the reception time period) with the current time (S402). When the current time is before the reservation start time (S402: before reservation start time), the process waits until the reservation start time (S403). When the current time reaches the reservation start time (S402: reaching reservation start time), the determination unit 43 starts reception of the entering-room operation (S404). The step S404 and the subsequent steps S405 to S408 are the same as the steps S205 to S209 of the second operation example described above (see FIG. 5), and therefore descriptions thereof are omitted.

In this operation example, it is set that the continuation of the occupied state of the user of the previous reservation is not regarded as the entrance of the user of the next reservation (continuation use: not allowed). Therefore, when the current time reaches the reservation start time, the position of the manual operation part 211 of the input device 21 is not checked (see the second operation example, step S04 in FIG. 5). Therefore, even when the reservations are continuous, the user needs to perform the leaving-room operation and the entering-room operation.

(3.5) Summary of Operation Examples

Figure 8:
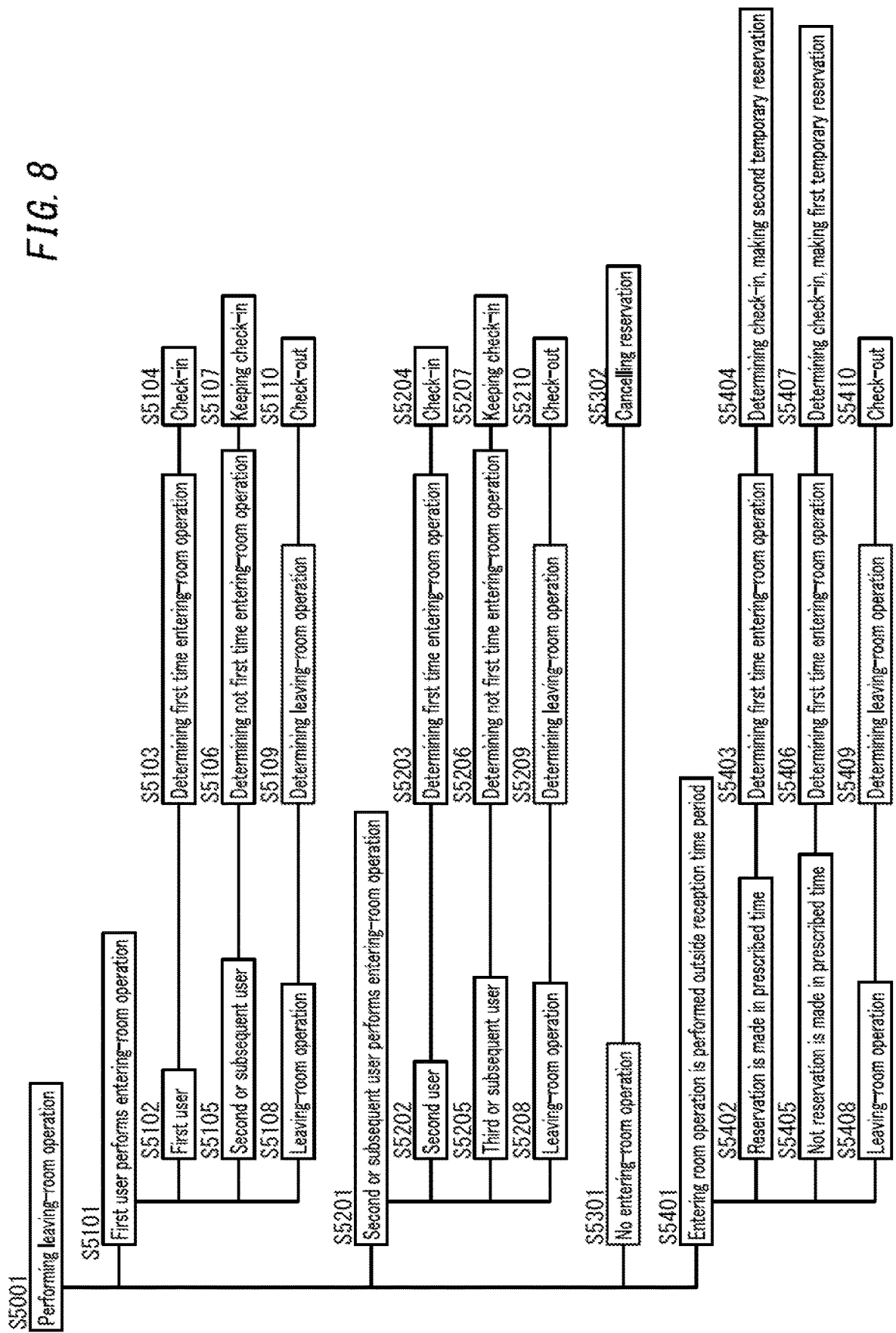
FIG. 8 is an explanatory diagram of an operation of the above reservation management system.

Next, a summary of the operation examples of the reservation management system 11 will be described with reference to FIG. 8 and FIG. 9. Here, it is assumed that the continuation of the occupied state of the user of the previous reservation is set to be regarded as the entrance of the user of the next reservation (continuation use: allowed).

Examples of the use situation of the reservation management system 11 includes: a situation where the user of the previous reservation performs the leaving-room operation at the time of leaving (S5001) (see FIG. 8) and another situation where the user of the previous reservation leaves without performing the leaving-room operation at the time of leaving (S6001) (see FIG. 9).

First, the situation where the user of the previous reservation performs the leaving-room operation at the time of leaving will be described with reference to FIG. 8.

It is assumed that the user of the previous reservation performs the leaving-room operation at the time of leaving (S5001). Therefore, at the time of entering of the user of the next reservation, the position of the manual operation part 211 of the input device 21 is the first position (vacant indication).

Subsequent situations may include the following four cases.

A first situation is a situation where a user who first enters a room (first user) performs the entering-room operation in the reception time period (S5101).

The determination unit 43 determines that the entering-room operation performed by the first user (S5102) is a first time entering-room operation (first entering-room operation) (S5103). Therefore, the determination unit 43 determines that the use of the facility 12 is started (checked in) (S5104).

In addition, in some cases, there may be a plurality of users and a second or subsequent user may perform the entering-room operation again (S5105). For example, a second user may moves the manual operation part 211 of the input device 21 from the second position (occupied indication) to the first position (leaving indication), and thereafter move it to the first position (occupied indication) again within the predetermined time. In this instance, the determination unit 43 determines that the entering-room operation in question is a second or subsequent entering-room operation (more than one time entering-room operation) and treats the leaving-room operation performed by the second user as being invalid (S5106). Therefore, the determination unit 43 determines that the use of the facility 12 is continued (check-in is maintained) (S5107).

In addition, it is assumed that a user ends the use of the facility 12 and performs the leaving-room operation (S5108), In this instance, after a lapse of the predetermined time from performance of the leaving-room operation, the determination unit 43 fixes determination of the leaving-room operation (S5109). Therefore, the determination unit 43 determines that the use of the facility 12 is ended (checked out) (S5110).

Next, a second situation is a situation where a user who enters a room first forgets to perform the entering-room operation, and a second or subsequent user performs the entering-room operation within the reception time period (S5201). Here, it is assumed that the second user performs the entering-room operation.

The determination unit 43 determines that the entering-room operation (S5202) performed by the second user is the first time entering-room operation (first entering-room operation) (S5203). Therefore, the determination unit 43 determines that the use of the facility 12 is started (checked in) (S5204).

In addition, a third or subsequent user may perform the entering-room operation again (S5205). For example, the third user may move the manual operation part 211 of the input device 21 from the second position (occupied indication) to the first position (leaving indication) and thereafter move it to the first position (occupied indication) within the predetermined time. In this instance, the determination unit 43 determines that the entering-room operation in question is the second or subsequent time entering-room operation (more than one time entering-room operation) and treats the leaving-room operation performed by the third user as, being invalid (S5206). Therefore, the determination unit 43 determines that the use of the facility 12 is continued (check-in is maintained) (S5207).

In addition, it is assumed that a user ends the use of the facility 12 and performs the leaving-room operation (S5208). In this instance, after a lapse of the predetermined time from performance of the leaving-room operation, the determination unit 43 fixes determination of the leaving-room operation (S5209). Therefore, the determination unit 43 determines that the use of the facility 12 is finished (checked out) (S5210).

A third situation is a situation where the entering-room operation is not performed even after a lapse of the predetermined time or more from the reservation start time (S5301). In this instance, the determination unit 43 determines that the reservation in question is a reservation accompanied with no use of the facility 12 (so-called false reservation) and cancels the reservation in question (automatic cancellation) (S5302).

A fourth situation is a situation where a user performs the entering-room operation in time outside the reception time period (S5401).

When there is a next reservation within the prescribed time from the current time (S5402), the determination unit 43 determines that the entering-room operation in question is the first time entering-room operation (first entering-room operation) (S5403). Therefore, the determination unit 43 determines that the use of the facility 12 is started (checked in), and makes a temporary reservation (second temporary reservation) regarding time until the next reservation start time (S5404).

When there is no next reservation within the prescribed time from the current time (S5405), the determination unit 43 determines that the entering-room operation in question is the first time entering-room operation (first entering-room operation) (S5406). Therefore, the determination unit 43 determines that the use of the facility 12 is started (checked in), and makes a temporary reservation (first temporary reservation) regarding the predetermined time (S5407).

In addition, it is assumed that the user ends the use of the facility 12 and performs the leaving-room operation (S5408). In this instance, after a lapse of the predetermined time from the performance of the leaving-room operation, the determination unit 43 fixes determination of the leaving-room operation (S5409). Therefore, the determination unit 43 determines that the use of the facility 12 is finished (checked out) (S5410).

Next, a case where the user of the previous reservation leaves the room without performing the leaving-room operation at the time of leaving the room will be described with reference to FIG. 9.

It is assumed that the user of the previous reservation leaves the room without performing the leaving-room operation at the time of leaving the room (S6001). Therefore, at the time of the entrance of the user of the next reservation, the position of the manual operation part 211 of the input device 21 is the second position (occupied indication).

The subsequent situations may include the following three examples.

A first situation is a situation where a user of a next reservation enters the room without performing the entering-room operation (S6101). In this instance, the determination unit 43 considers reception of the first time entering-room operation (first entering-room operation) (S6102), and determines that the use of the facility 12 is continued (check-in maintenance) (S6103). In addition, in some cases, the user of the previous reservation may continue the use after the start time of the reception time period of the next reservation (reservation start time). Also in this case, similarly to the above, the determination unit 43 considers reception of the first time entering-room operation (first entering-room operation), and determines that the use of the facility 12 is continued (check-in maintenance).

A second situation is a situation where a user of a subsequent reservation performs the entering-room operation (S6201). For example, the user of the next reservation moves the manual operation part 211 of the input device 21 from the second position (occupied indication) to the first position (leaving indication), and then moves it to the second position (occupied indication) again.

When the entering-room operation is performed in the reservation time period of the previous reservation (S6202), the determination unit 43 determines that this entering-room operation is a second or subsequent time entering-room operation (more than one time entering-room operation)

(S6203). Therefore, the determination unit 43 determines that the use of the facility 12 is continued (check-in maintenance) (S6204).

Also, in some cases, the entering-room operation is performed within the reservation time period (S6205). The expression "within the reservation time period" as used herein means the time of the reservation subsequent to the previous reservation. Here, it is assumed that the entering-room operation is performed within the time reserved by the user.

When the user who performs the entering-room operation is a first user (S6206), the determination unit 43 determines that this entering-room operation is the first time entering-room operation (first entering-room operation) (S6207). Therefore, the determination unit 43 determines that the use of the facility 12 is started (checked in) (S6208). In addition, when there is a plurality of users and a second or subsequent user perform the entering-room operation again (S6209), the determination unit 43 determines that this entering-room operation is e second or subsequent time entering-room operation (more than one time entering-room operation) and treats the leaving-room operation made by the second or subsequent user as being invalid (S6210). Therefore, the determination unit 43 determines that the use of the facility 12 is continued (S6211).

Also, the entering-room operation may be performed in time not kept for reservations (S6212). The time not kept for reservations includes, for example, time from the reservation end time of the previous reservation to the reservation start time of the next reservation.

When the next reservation appears within the prescribed time from the current time (S6213), the determination unit 43 determines that the entering-room operation performed by the first user (S6214) is the first time entering-room operation (first entering-room operation) (S6215). Therefore, the determination unit 43 determines that the use of the facility 12 is started (checked in), and makes the temporary reservation (second temporary reservation) regarding time until the next reservation start time (S6216).

When there is no subsequent reservation within the prescribed time from the current time (S6217), the determination unit 43 determines that the entering-room operation performed by the first user (S6218) is the first time entering-room operation (first entering-room operation) (S6219). Therefore, the determination unit 43 determines that the use of the facility 12 is started (checked in), and makes the temporary reservation (first temporary reservation) regarding the predetermined time (S6220).

In addition, it is assumed that the user ends the use of the facility 12 and performs the leaving-room operation (S301). In this instance, after a lapse of the predetermined time from the performance of the leaving-room operation, the determination unit 43 fixes the determination of the leaving-room operation (S6302). Therefore, the determination unit 43 determines that the use of the facility 12 is completed (checked out) (S6303).

(4) Variations

Next, variations of the reservation management system 11 will be described.

(4.1) First Variation

Figure 10A:
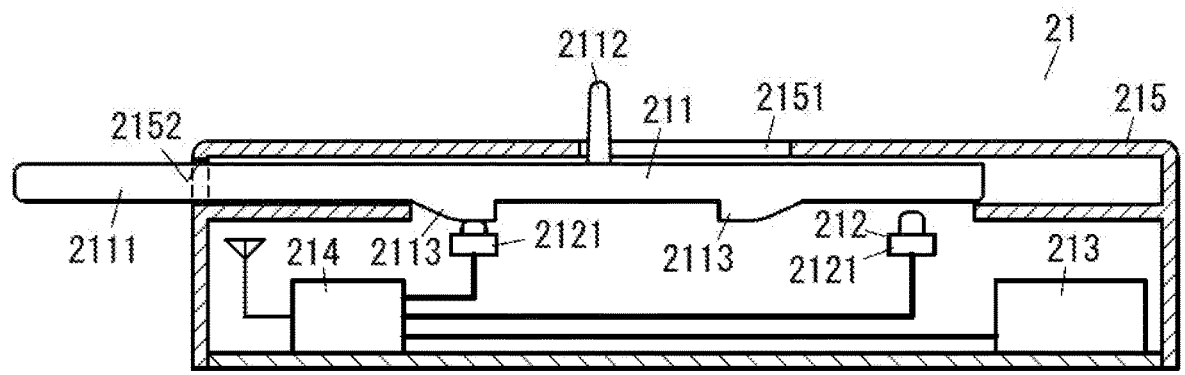
FIG. 10A is a schematic diagram of an input device of a first modification of the reservation management system according to one embodiment.
Figure 10B:
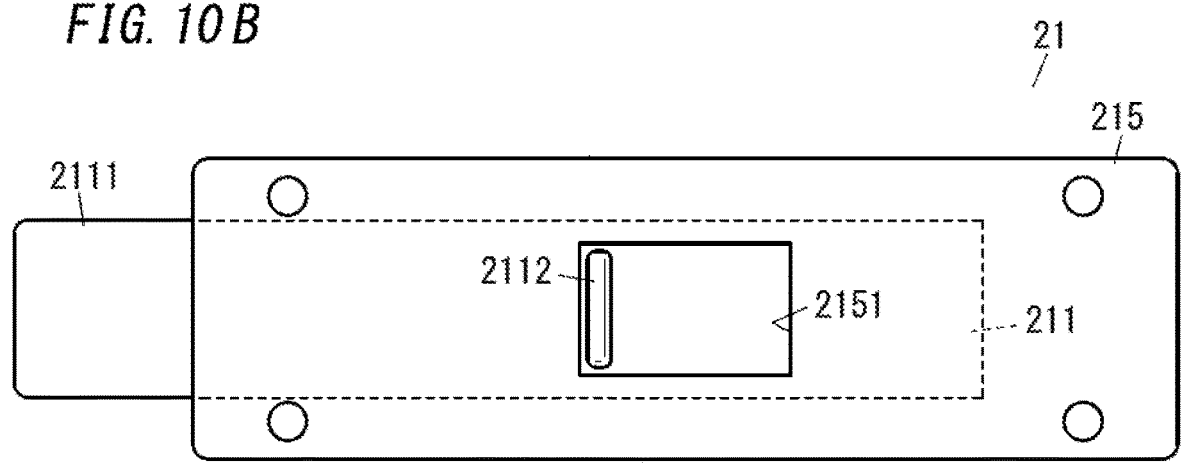
FIG. 10B is a plan view of the above input device.

The input device 21 included in the reservation management system 11 according to the present variation will be described with reference to FIG. 10A and FIG. 10B.

In the input device 21 of the present variation, the case 215 includes an opening 2152 in a side surface thereof. The display unit 2111 of the manual operation part 211 is formed to have a larger dimension in a direction along the movement direction of the manual operation part 211 than the display unit 2111 of the manual operation part 211 of the above-described embodiment (see FIG. 2A and FIG. 2B). An end portion of the display unit 2111 in a direction 141 along the movement direction of the manual operation part 211 can protrude outside the case 215 through the opening 2152. In the input device 21 according to the present variation, when the manual operation part 211 is in the first position (vacant indication), the entire display unit 2111 is housed in the case. When the manual operation part 211 moves from the first position (vacant indication) to the second position (occupied indication), the end portion of the display unit 2111 protrudes outside the case 215 through the opening 2152. A portion of the display unit 2111 that protrudes outside the case 215 may have indication indicating the occupied state.

In the input device 21 of the present variation, when the manual operation part 211 is in the first position, the entire display unit 2111 is housed in the case 215. When the manual operation part 211 is in the second position, part of the display unit 2111 protrudes outside the case 215. This makes it easier for the user to recognize the position of the manual operation part 211.

Figure 11A:
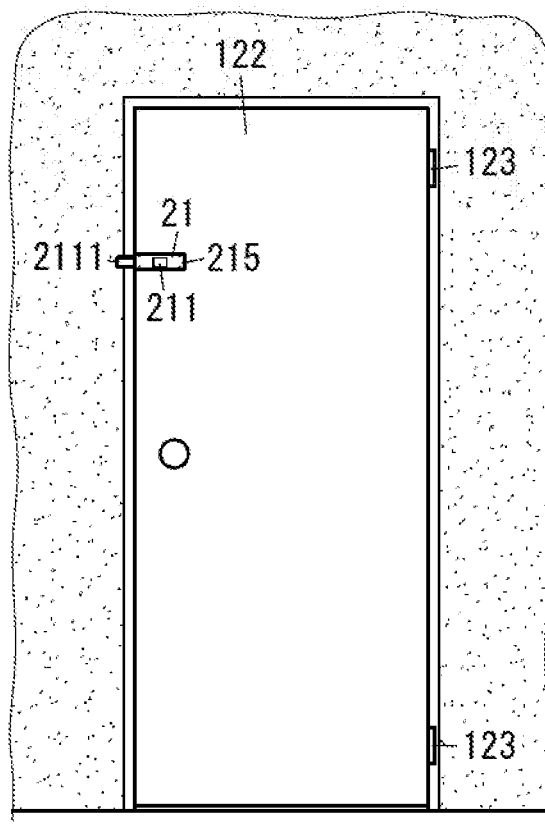
FIG. 11A is a front view of the above input device while being placed on a door.
Figure 11B:
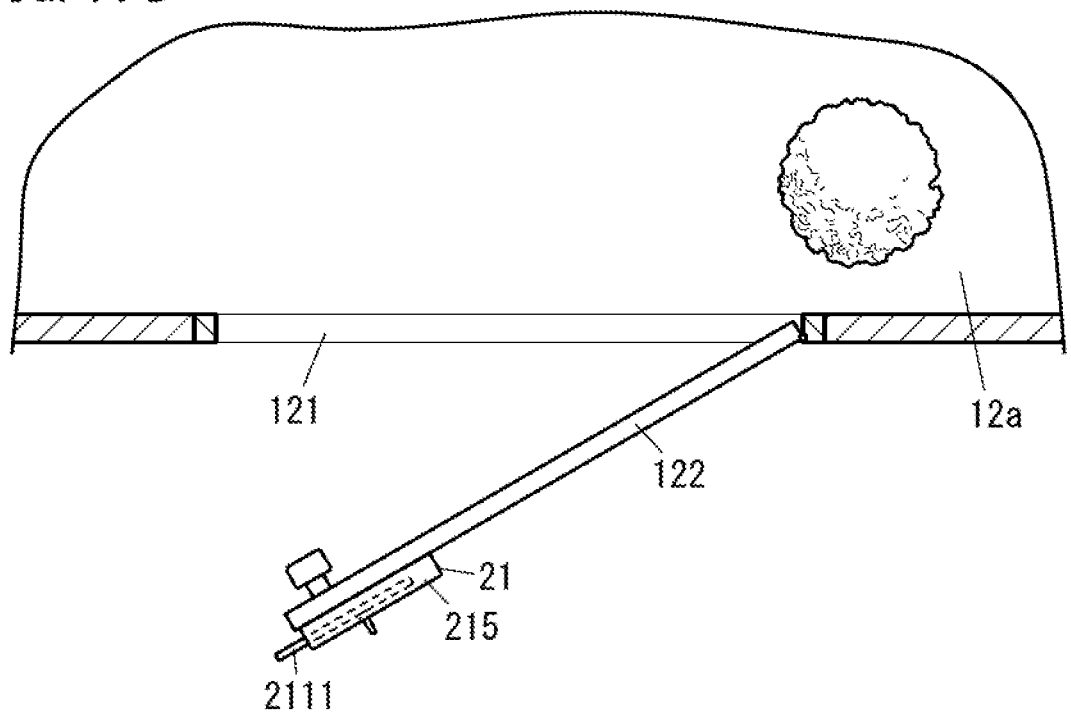
FIG. 11B is a plan view of the above input device while being placed on the door.

As shown in FIG. 11A and FIG. 11B, the input device 21 of the present variation is attached to, for example, a door 122 provided in a doorway 121 of the conference room 12a. In the example shown in FIG. 11A and FIG. 11B, the door 122 is an outward opening door, and the user opens the door 122 by pulling the door 122 when entering the room. The input device 21 is attached to an opposite end of the door 122 from a hinge 123. The input device 21 is attached to the door 122 such that part of the display unit 2111 protrudes from the opposite end of the door 122 from the hinge 123 while the manual operation part 211 is in the second position. As a result, while the manual operation part 211 is in the second position (occupied indication), part of the display unit 2111 protrudes from the door 122. Thus, a user leaving the conference room 12a easily notices that the input device 21 shows the occupied indication. Therefore, when the user leaves the room, the user would be prevented from forgetting the leaving-room operation.

Figure 12:
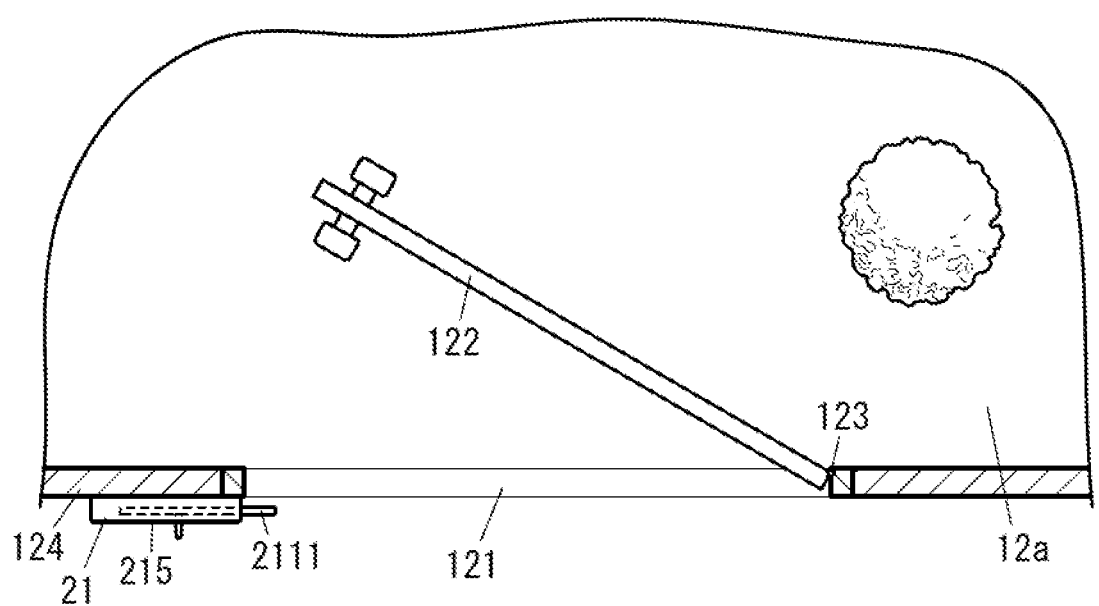
FIG. 12 is a plan view of the above input device while being placed on a wall.

Further, as shown, in FIG. 12, when the door 122 is an inward opening door, it is preferable that the input device 21 is provided to an end portion of the wall 124 which faces the hinge 123 with the doorway in-between. In this case, the input device 21 is attached so that part of the display unit 2111 protrudes from the wall 124 toward the doorway 121 while the manual operation part 211 is in the second position (occupied indication). This makes it easier for a user leaving the conference room 12a to notice that the input device 21 shows the occupied indication. Therefore, when the user leaves the room, the user would be prevented from forgetting the leaving-room operation.

In addition, the occupied and vacant indication of the display unit 2111 may be presented in color instead of characters. For example, the occupied indication is presented by red and the vacant indication is presented by green. This makes it possible to cope with both of the outer opening door and the inward opening door by reversing the input device 21.

The input device 21 may be configured such that part of the display unit 2111 protrudes outside the case 215 while the manual operation part 211 is in the first position.

Figure 13:
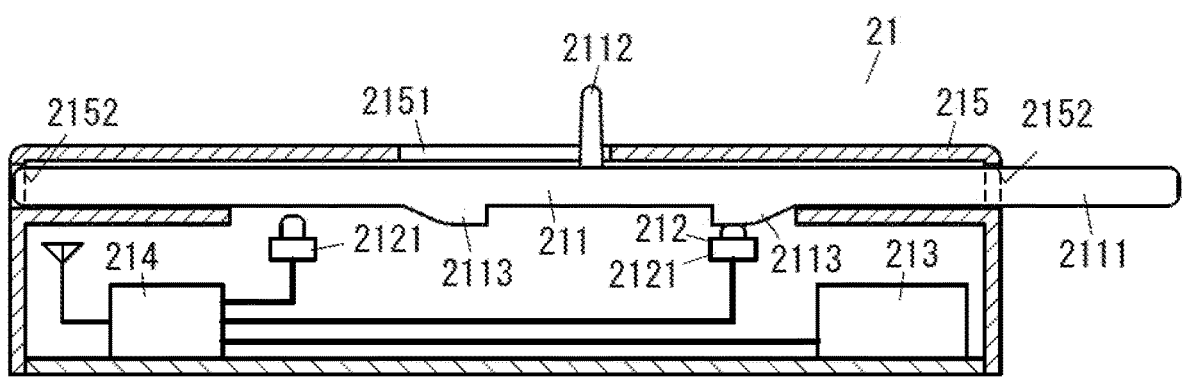
FIG. 13 is a schematic diagram of a variation of the above input device.

As shown in FIG. 13, the input device 21 may be configured such that part of the display unit 2111 protrudes outside the case 215 while the manual operation part 211 is in the first position or the second position. The case 215 is formed with two openings 2152 for allowing the display unit 2111 to protrude outside. While the manual operation part 211 is in the first position, a first end of the display unit 2111 protrudes from a first opening 2152 to the outside of the case 215. While the manual operation part 211 is in the second position, a second end of the display unit 2111 protrudes from a second opening 2152 to the outside of the case 215. This makes it easier for a user to recognize whether the manual operation part 211 is in the first position or the second position.

Figure 14A:
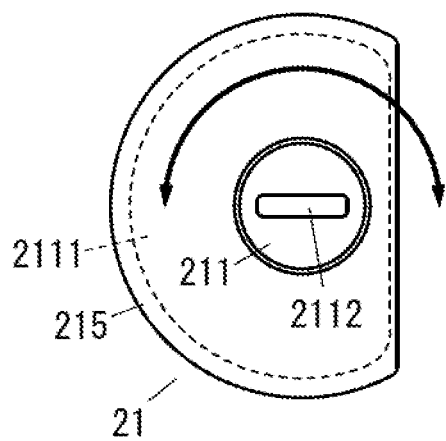
FIG. 14A is a plan view of another variation of the above input device which is in a first state.
Figure 14B:
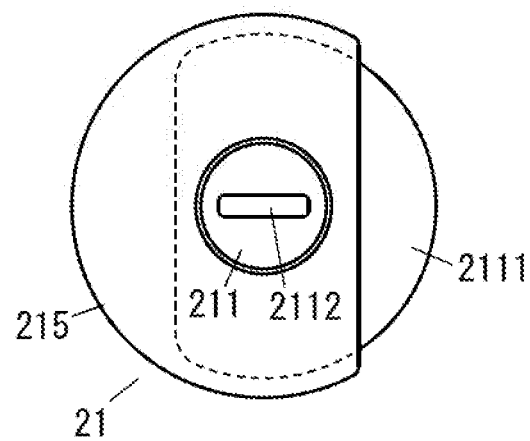
FIG. 14B is a plan view of said another variation of the above input device which is in a second state.

In the example described above, the input device 21 is configured to allow a user to slide the manual operation part 211 along one direction when the user performs the entering-room operation and the leaving-room operation, but may not be limited to this configuration. As shown in FIG. 14A and FIG. 14B, the input device 21 may be configured to allow a user to rotate the manual operation part 211 when the user performs the entering-room operation and the leaving-room operation. In the input device 21 shown in FIG. 14A and FIG. 14B, the knob 2112 of the manual operation part 211 is provided at a substantially central portion of the case 215 having a partially cut out cylindrical shape. By rotating the knob 2112, the manual operation part 211 is rotated between the first position and the second position. While the manual operation part 211 is in the first position, the display unit 2111 is housed in the case 215. While the manual operation part 211 is in the second position, the display unit 2111 protrudes outside the case 215. Part of the display unit 2111 protruding from the case 215 may be provided with indication indicating an occupied state.

(4.2) Other Variations

The control unit 410 as described above is realized by a computer system. That is, the control unit 410 is realized by the computer system executing the program. This program is a program for causing the computer system to execute the following reservation management method. The reservation management method performs reservation management based on a wireless signal transmitted by the input device 21. The input device 21 includes the manual operation part 211. The manual operation part 211 is moved from the first position to the second position when the performance of the reservation is started, and is moved from the second position to the first position when the performance of the reservation is ended. When the manual operation part 211 is moved, the input device 21 transmits a wireless signal containing the movement information of the manual operation part 211 and the ID information. The reservation management method includes associating the reservation information including the reservation start time and the ID information with each other and storing them in the storage unit 44, and determining the reservation performance status based on the current time, the reservation start time, and the movement information. According to these reservation management method and program, it is possible to manage the reservation performance status.

Further, in the example described above, the reservation management device 41 is configured to receive indirectly through the repeater 31 a wireless signal transmitted by the input device 21. However, the reservation management device 41 may not be limited to this configuration. The reservation management device 41 may be configured to receive directly a wireless signal transmitted from the input device 21.

The application of the reservation management system 11 is not limited to reservation management of the facility 12. For example, the reservation management system 11 may be applied to management of a rental reservation of a bicycle, a car, or the like. The reservation management system 11 may be used for, for example, employee attendance management. In this case, attendance corresponds to start of performance of a reservation, and departure corresponds to end of performance of a reservation. An employee moves the manual operation part 211 of the input device 21 at the time of attendance and at the time of leaving work.

In the example described above, functions of the reservation management unit are aggregated in one device (the reservation management device 41), but may be distributed in a plurality of devices. At least one of the functions of the reservation management unit may be realized by the cloud (cloud computing), for example.

Entities performing the aforementioned reservation management unit described (the reservation management device 41) include a computer system. The computer system includes a processor and a memory as hardware. The processor executes a program recorded in the memory of the computer system, thereby realizing the functions as the entities of the reservation management unit in the present disclosure. The program may be recorded in the memory of the computer system in advance or may be provided through a telecommunication line. The program may be provided by being recorded on a non-transitory recording medium such as a memory card, an optical disk, or a hard disk drive which are readable by the computer system. The processor of the computer system includes one or more electronic circuits including a semiconductor integrated circuit (IC) or a large scale integrated circuit (LSI). Although the processor is referred to herein as IC or LSI, the processor is called in different names depending on the degree of integration. A processor called, system LSI, very large scale integration (VLSI), or ultra large scale integration (ULSI) may be adopted. Field-Programmable Gate Arrays (FGPA), or reconfigurable logical devices capable of reconfiguring bonding relationships within an LSI or setting up circuit partitions within an LSI, which are programmed after fabrication of an LSI, can also be used for the same purpose. A plurality of electronic circuits may be integrated in one chip or may be distributed in a plurality of chips. The plurality of chips may be integrated in one device or may be distributed and provided in a plurality of devices.

(Conclusion)

A reservation management system (11) according to a first aspect includes an input device (21) and a reservation management unit (reservation management device 41). The input device (21) includes a manual operation part (211) movable between a first position and a second position and is configured to send a wireless signal containing movement information of the manual operation part (211) and ID information in response to movement of the manual operation part (211). The reservation management unit (41) is configured to perform reservation management based on the wireless signal sent from the input device (21). The manual operation part (211) is moved from the first position to the second position when performance of a reservation is started, and being moved from the second position to the first position when performance of a reservation is ended. The reservation management unit (41) includes a clock unit (45), a storage unit (44), and a determination unit (43). The clock unit (45) is configured to measure time. The storage unit (44) is configured to associate reservation information containing a reservation start time and the ID information with each other and store them. The determination unit (43) is configured to determine a reservation performance status based on a current time, the reservation start time, and the movement information.

According to this aspect, the reservation information and the ID information are stored in the storage unit (44) and the determination unit (43) determines the reservation performance status, and therefore it is possible to associate the reservation information and the use status (reservation performance status) with each other.

In a reservation management system (11) according to a second aspect in combination with the first aspect, the determination unit (43) determines that performance of a reservation is ended after a lapse of predetermined time from time when the manual operation part (211) is moved from the second position to the first position.

According to this aspect, erroneous determination of the end of the reservation performance which is caused by user's erroneous operation of moving the manual operation part (211) to the second position to the first position can be suppressed by returning the manual operation part (211) to the second position.

In a reservation management system (11) according to a third aspect in combination with the first or second aspect, the determination unit (43) is configured to determine that performance of a reservation is started when the manual operation part (211) is in the second position at the reservation start time. The determination unit (43) is configured to cancel a reservation unless the manual operation part (211) is moved from the first position to the second position before a lapse of predetermined time from the reservation start time.

According to this aspect, a reservation accompanied with no performance (false reservation) can be canceled.

In a reservation management system (11) according to a fourth aspect in combination with any one of the first to third aspects, the determination unit (43) is configured to store not the reservation information but a performance history in the storage unit (44) when the manual operation part (211) is moved from the first position to the second position in a time period not kept for a reservation.

According to this aspect, it is possible to manage history of cases where performance is made without any reservation.

In a reservation management system (11) according to a fifth aspect in combination with any one of the first to third aspects, the determination unit (43) is configured to store the reservation information containing a current time as the reservation start time, in the storage unit (44) when the manual operation part (211) is moved from the first position to the second position in a time period not kept for a reservation.

According to this aspect, a temporary reservation can be applied by manually operating the input device (21).

In a reservation management system (11) according to a sixth aspect in combination with the fifth aspect, the determination unit (43) is configured to store the reservation information containing, as a reservation end time, a time after predetermined time from a current time or the reservation start time of a next reservation, in the storage unit (44) when the manual operation part (211) is moved from the first position to the second position in a time period not kept for reservation.

According to this aspect, it is possible to reduce probability a temporally overlap between a temporarily-submitted reservation and other reservations.

In a reservation management system (11) according to a seventh aspect in combination with any one of the first to sixth aspects, the storage unit (44) is configured to associate a current position of the manual operation part (211) in the input device (21) and the ID information with each other and store them.

According to this aspect, the reservation management unit (41) can obtain the current position of the manual operation part (211) of the input device (21) without making any communication.

An input device (21) according to an eighth aspect is used in the reservation management system (11) and includes: the manual operation part (211); a display unit (2111); and a case (215). The display unit (2111) is configured to display the reservation performance status. The case (215) is for holding the manual operation part (211) and the display unit (2111). The display unit (2111) is configured to move in response to movement of the manual operation part (211) and protrude from the case (215) when the manual operation part (211) is in at least one of the first position and the second position.

This aspect can make it easier for the user to recognize the position of the manual operation part (211).

A reservation management method according to a ninth aspect performs reservation management based on a wireless signal sent from an input device (21). The input device (21) includes a manual operation part (211). The manual operation part (211) is moved from a first position to a second position when performance of reservation is started and is moved from the second position to the first position when performance of reservation is ended. The input device (21) is configured to send the wireless signal containing movement information of the manual operation part (211) and ID information in response to movement of the manual operation part (211). The reservation management method includes: associating reservation information containing a reservation start tune and the ID information with each other and storing them in a storage unit (44); and determining a reservation performance status of reservation based on a current time, the reservation start time, and the movement information.

According to this aspect, it is possible to associate the reservation information and the use status (reservation performance status) with each other.

A program according to a tenth aspect allows a computer system to perform the reservation management method.

According to this aspect, it is possible to associate the reservation information and the use status (reservation performance status) with each other.

REFERENCE SIGNS LIST

11 Reservation Management System
21 Input Device
211 Manual Operation Part
2111 Display Unit
215 Case
41 Reservation Management Device (Reservation Management Unit)
43 Determination Unit
44 Storage Unit
45 Clock Unit

The invention claimed is:
1. A reservation management system comprising:
an input device which includes a manual operation part movable between a first position and a second position and is configured to send a wireless signal containing movement information of the manual operation part and ID information in response to movement of the manual operation part; and a reservation management unit configured to perform reservation management based on the wireless signal sent from the input device, the manual operation part being moved from the first position to the second position when performance of a reservation is started, and being moved from the second position to the first position when performance of a reservation is ended, the reservation management unit including a clock unit configured to measure time, a storage unit configured to associate reservation information containing a reservation start time and the ID information with each other and store them, and a determination unit configured to determine a reservation performance status based on a current time, the reservation start time, and the movement information, the determination unit being configured to store a performance history free of the reservation information in the storage unit when the manual operation part is moved from the first position to the second position in a time period not kept for a reservation.

2. The reservation management system according to claim 1, wherein the determination unit determines that performance of a reservation is ended after a lapse of predetermined time from time when the manual operation part is moved from the second position to the first position.

3. The reservation management system according to claim 2, wherein the determination unit is configured to determine that performance of a reservation is started when the manual operation part is in the second position at the reservation start time, and cancel a reservation unless the manual operation part is moved from the first position to the second position before a lapse of predetermined time from the reservation start time.

4. The reservation management system according to claim 2, wherein the storage unit is configured to associate a current position of the manual operation part in the input device and the ID information with each other and store them.

5. The reservation management system according to claim 1, wherein the determination unit is configured to determine that performance of a reservation is started when the manual operation part is in the second position at the reservation start time, and cancel a reservation unless the manual operation part is moved from the first position to the second position before a lapse of predetermined time from the reservation start time.

6. The reservation management system according to claim 5, wherein the storage unit is configured to associate a current position of the manual operation part in the input device and the ID information with each other and store them.

7. The reservation management system according to claim 1, wherein the storage unit is configured to associate a current position of the manual operation part in the input device and the ID information with each other and store them.

8. An input device used in the reservation management system according to claim 1, comprising:

the manual operation part;

a display unit configured to display the reservation performance status; and a case for holding the manual operation part and the display unit, the display unit being configured to move in response to movement of the manual operation part and protrude from the case when the manual operation part is in at least one of the first position and the second position.

9. A reservation management method for performing reservation management based on a wireless signal sent from an input device which includes a manual operation part which is moved from a first position to a second position when performance of reservation is started and is moved from the second position to the first position when performance of reservation is ended, and is configured to send the wireless signal containing movement information of the manual operation part and ID information in response to movement of the manual operation part, the method comprising:

associating reservation information containing a reservation start time and the ID information with each other and storing them in a storage unit;

determining a reservation performance status of reservation based on a current time, the reservation start time, and the movement information; and storing a performance history free of the reservation information in the storage unit when the manual operation part is moved from the first position to the second position in a time period not kept for a reservation.

10. A non-transitory storage medium storing a program for allowing a computer system to perform the reservation management method according to claim 9.

11. A reservation management system comprising:

an input device which includes a manual operation part movable between a first position and a second position and is configured to send a wireless signal containing movement information of the manual operation part and ID information in response to movement of the manual operation part; and a reservation management unit configured to perform reservation management based on the wireless signal sent from the input device, the manual operation part being moved from the first position to the second position when performance of a reservation is started, and being moved from the second position to the first position when performance of a reservation is ended, the reservation management unit including a clock unit configured to measure time, a storage unit configured to associate reservation information containing a reservation start time and the ID information with each other and store them, and a determination unit configured to determine a reservation performance status based on a current time, the reservation start time, and the movement information, the determination unit being configured to store the reservation information containing a current time as the reservation start time, in the storage unit when the manual operation part is moved from the first position to the second position in a time period not kept for a reservation, and the determination unit being configured to store the reservation information containing, as a reservation end time, a time after predetermined time from a current time or the reservation start time of a next reservation, in the storage unit when the manual operation part is moved from the first position to the second position in a time period not kept for reservation.

12. The reservation management system according to claim 11, wherein
the determination unit determines that performance of a reservation is ended after a lapse of predetermined time from time when the manual operation part is moved from the second position to the first position.

13. The reservation management system according to claim 11, wherein
the determination unit is configured to
determine that performance of a reservation is started when the manual operation part is in the second position at the reservation start time, and
cancel a reservation unless the manual operation part is moved from the first position to the second position before a lapse of predetermined time from the reservation start time.

14. The reservation management system according to claim 11, wherein
the storage unit is configured to associate a current position of the manual operation part in the input device and the ID information with each other and store them.

15. An input device used in the reservation management system according to claim 11, comprising:
the manual operation part;
a display unit configured to display the reservation performance status; and
a case for holding the manual operation part and the display unit,
the display unit being configured to move in response to movement of the manual operation part and protrude from the case when the manual operation part is in at least one of the first position and the second position.

16. A reservation management method for performing reservation management based on a wireless signal sent from an input device which includes a manual operation part which is moved from a first position to a second position when performance of reservation is started and is moved from the second position to the first position when performance of reservation is ended, and is configured to send the wireless signal containing movement information of the manual operation part and ID information in response to movement of the manual operation part,
the method comprising:
associating reservation information containing a reservation start time and the ID information with each other and storing them in a storage unit;
determining a reservation performance status of reservation based on a current time, the reservation start time, and the movement information;
storing the reservation information containing a current time as the reservation start time, in the storage unit when the manual operation part is moved from the first position to the second position in a time period not kept for a reservation; and
storing the reservation information containing, as a reservation end time, a time after predetermined time from a current time or the reservation start time of a next reservation, in the storage unit when the manual operation part is moved from the first position to the second position in a time period not kept for reservation.

17. A non-transitory storage medium storing a program for allowing a computer system to perform the reservation management method according to claim 16.

* * * * *